United States Patent Office 3,579,501
Patented May 18, 1971

3,579,501
6-[α-(3 - GUANYL - 1 - UREIDO)PHENYL- OR THIENYL-ACETAMIDO]PENICILLANIC ACIDS
Donald Neil McGregor, Fayetteville, N.Y., assignor to Bristol-Myers Company, New York, N.Y.
No Drawing. Continuation-in-part of application Ser. No. 780,557, Dec. 2, 1968. This application Aug. 22, 1969, Ser. No. 852,457
Int. Cl. C07d 99/16
U.S. Cl. 260—239.1
16 Claims

ABSTRACT OF THE DISCLOSURE

6-[α-(3-guanyl - 1 - ureido)phenylacetamido]- and 6-[α-(3-guanyl - 1 - ureido)thienylacetamido] - penicillanic acids are valuable as antibacterial agents, nutritional supplements in animal feeds, therapeutic agents in poultry and animals, including man, and are especially useful in the treatment of infectious diseases caused by Gram-positive and Gram-negative bacteria, most particularly those caused by the Pseudomonas genus. 6-[D-α-(3-guanyl-1-ureido)phenylacetamido] - penicillanic acid, a preferred embodiment of the invention, is prepared by the reaction of 6-(D-α-amino - phenylacetamido) - penicillanic acid (ampicillin) with a guanylcarbamoylating agent.

CROSS-REFERENCE TO RELATED APPLICATION

This application is a continuation-in-part of my prior copending application filed Dec. 2, 1968 as Ser. No. 780,557.

BACKGROUND OF THE INVENTION (1) Field of the invention

The penicillins of the present invention possess the usual attributes of such compounds and are particularly useful in the treatment of Pseudomonas infections.

(2) Description of the prior art

Heretofore very few penicillins have been found to possess any sufficient activity against Pseudomonas. The compounds of the present invention exhibit this desirable activity at significantly low concentrations.

α-Aminobenzylpenicillins and α-aminothenylpenicillins are known, as from U.S. Pats. 2,985,648, 3,140,282, 3,373,156, 3,308,023 and 3,342,677 and British Pats. 903,-785, 918,169, 978,178, 991,586 and 1,033,257 and for such compounds bearing substituents on the α-amino group from such British patents as 891,777, 894,457, 1,048,907, 1,051,675, 1,053,818, 1,064,893, 1,066,107, 1,080,247, 1,125,339 and 1,130,445 and from South Africa 67/2,092. N-substituted 6-ureidopenicillanic acids have been disclosed, for example, in U.S. Pats. 3,118,877, 3,120,512 and 3,180,863 and in Belgain Pat. 603,703 and German Pat. 1,120,072; 6-ureidopenicillanic acid itself is disclosed in German Pats. 1,141,640 and 1,120,072 and French Pat. 1,324,918. A few substituted α-ureidomethyl-penicillins are disclosed in U.S. Pat. 3,352,851 and British Pat. 1,040,166; none have a substituent in the 3-position of the ureido group. British Pat. 1,061,335 discloses 6-(D-α-hydrazinocarbonylamino - α - phenylacetamido)penicillanic acid and 6-(D-α-benzyloxycarbonylhydrazinocarbonylamino-α-phenylacetamido)penicillanic acid and, in general, other so-called acyl groups in place of the benzyloxycarbonyl group.

Ring-substituted α-aminobenzylpenicillins have also been reported by Ekstrom et al., Acta Chemica Scandinavica 19 (2), 281–299 (1965) and in U.S. Pats. 3,316,247 and 3,385,847 and can also be made by standard methods from the 2-phenylglycines reported by A. H. Neims et al., Biochemistry (Wash.) 5 (1), 203–213 (January 1966) and by P. Friis et al., Acta Chemica Scandinavica 17 (9), 2391–2396 (1963).

A variety of α-guanido-arylmethylpenicillins are disclosed in U.S. Pat. 3,406,185.

SUMMARY OF THE INVENTION

There are provided according to the present invention compounds, preferably of the D configuration, having the formula

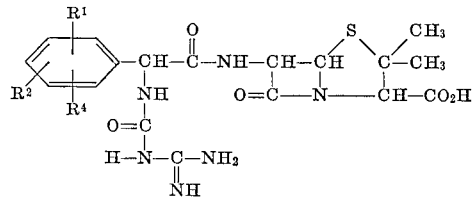

or

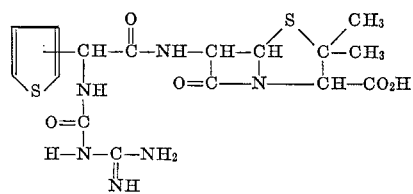

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)alkyl comprising straight and branched chain saturated aliphatic groups having from 1 to 6 carbon atoms inclusive, (lower)alkoxy, sulfamyl, chloro, iodo, bromo, fluoro or trifluoromethyl; and nontoxic, pharmaceutically acceptable salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethyl-amine, 1-ephenamine, N,N'-dibenzylethylenediamine, dehydroabietylamine, N,N' - bis-dehydroabietylethylenediamine, N-(lower)alkylpiperidine, e.g., N-ethylpiperidine and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, maleate, mandelate, ascorbate and the like.

In the preferred embodiments of this invention, $R^1$, $R^2$ and $R^3$ are each hydrogen, hydroxy or amino (and preferably $R^2$ and $R^3$ are hydrogen), the compounds exist in the zwitterion form or as the salt of a strong acid and the α-carbon of the penicillin side chain (to which the 3-guanyl-1-ureido group is attached) is of the D configuration.

DETAILED DESCRIPTION

Antibacterial agents such as ampicillin (U.S. 2,985,648) have proved highly effective in the past in the therapy of infections due to Gram-positive and Gram-negative bacteria but these compounds have been notably lacking in their ability to effectively control Pseudomonas infections. Carbenicillin ("Pyopen") (U.S. 3,142,673 and 3,282,926) is active against Pseudomonas only in high concentrations and is useful in such infections in man only when given by injection.

It was an object of the present invention to provide compounds useful in the treatment of infections caused by Gram-positive and Gram-negative bacteria, including particularly those caused by *Pseudomonas aeruginosa*.

The compounds of the present invention as defined above under "Summary of the Invention" are particularly useful in that they possess antibacterial activity against both Gram-positive and Gram-negative bacteria, and most particularly exhibit actvity against *Pseudomonas aeruginosa* infections.

The α-carbon atom of the penicillin side chain (to which the 3-guanyl-1-ureido group is attached) is an asymmetric carbon atom and the compounds of this invention can therefore exist in two optically active isomeric forms [the D- and L-diastereoisomers], as well as in the DL form which is a mixture of the two optically active forms; all such isomeric forms of the compounds are included within the scope of the present invention but the D form is preferred. Also included within the scope of the present invention are easily hydrolyzed esters which are converted to the free acid form by chemical or enzymatic hydrolysis, as illustrated in Belgian Pat. 684,288 and U.S. Pat. 3,399,207.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

The compounds of the present invention are prepared by the process comprising the consecutive steps of (a) Mixing a compound having the formula

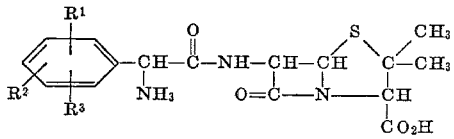

or

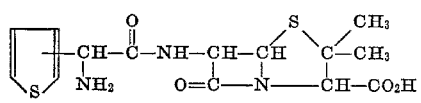

or a mono- or polyhydrate or salt thereof, wherein R¹, R² and R³ each is hydrogen, nitro, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo fluoro or trifluoromethyl; with a guanylcarbamoylating agent preferably in a ratio of 1.0 to 1.5 moles of said agent per mole of the penicillin acid, in the presence of a base, preferably an organic base such as a pyridine, N-methylpiperidine, tri(lower)alkylamine, or the like, but preferably in the presence of pyridine or triethylamine, and preferably in a solvent such as water, dimethylformamide, dimethylsulfoxide, chloroform, tetrahydrofuran, n-pentane, methylene chloride, but preferably water, while preferably maintaining the pH above 6 at a temperature in the range of about −20° C. to 50° C., but preferably about 0° C. to 20° C., preferably with agitation, to porduce a compound having the formula

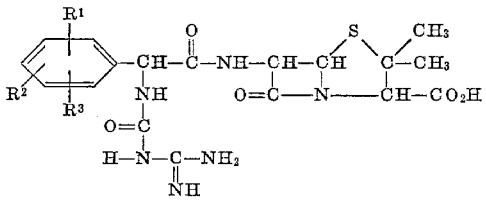

or

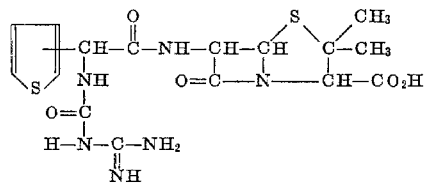

wherein R¹, R² and R³ each is hydrogen, nitro, (lower)alkylamino, di(lower)alkylamino, (lower)alkanoylamino, amino, hydroxy, (lower)alkanoyloxy, (lower)alkyl comprising straight and branched chain saturated aliphatic groups having from 1 to 6 carbon atoms inclusive, (lower) alkoxy, sulfamyl, cholro, iodo, bromo, fluoro or trifluoromethyl; or the corresponding salt thereof.

Included within the present invention are salts of a nontoxic, pharmaceutically acceptable metallic action such as sodium, potassium, calcium, aluminum and the like, the ammonium cation and substituted ammonium cations, e.g., cations of such nontoxic amines as tri-(lower)alkylamines, i.e., triethylamine, etc., procaine, dibenzylamine, N-benzyl-beta-phenethylamine, 1-ephenamine, N-N'-dibenzylethylenediamine, dehydroabietylamine, N,N'-bisdehydroabietylethylenediamine, N - (lower)alkylpiperidine, e.g., N-ethylpiperidine, or other such amines which have been used to form pharmaceutically acceptable nontoxic salts with benzylpenicillin. Such salts are preferably made by treatment of the free acid (zwitterion) form of the product with a strong base.

Also included within the present invention are nontoxic, pharmaceutically acceptable acid addition salts including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like. Such salts are preferably made by treatment of the free acid (zwitterion) form of the product with a strong acid.

In the treatment of bacterial infections in man, the compounds of this invention are administered topically, orally and parenterally in accordance with conventional procedures for antibiotic administration in an amount of from about 5 to 125 mg./kg./day and preferably in the range of 15 to 50 mg./kg./day for Pseudomonas infections in divided dosages, e.g., three or four times a day. They are administered in dosage units containing, for example, 125, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The guanylcarbamoylating agent used in the present invention is made by various methods known to the art, the most useful of which is disclosed by J. Thiele and E. Uhlfelder, Ann., 303, 107 (1898). A typical guanylcarbamoylating agent is the mixture of 4-guanylsemicarbazide with nitrous acid or a source thereof or an oxidizing agent such as iodine or equivalents thereof such as sodium hypochlorite or hypochlorous acid or chlorine. It is advantageous to conduct this oxidation in the presence of sufficient base to neutralize the acid formed during the oxidation of the hydrazine portion of the acyl hydrazide to its end product, nitrogen. Thus hydrogen iodide is formed when iodine is used. Both organic and inorganic bases are suitable. It is believed that these reactions may lead to the formation of azidoformylguanidine and/or guanylisocyanate as the intermediate which reacts with the α-amino group of the penicillin to form the desired α-guanylureidopenicillin but this is a matter of theory and is not essential to the conduct of the process of the present invention. Amidinocarbamoyl is a recognized synonym for guanylcarbamoyl.

Illustrative examples of the preparation of penicillins of the present invention follow. In the title of each example the moiety.

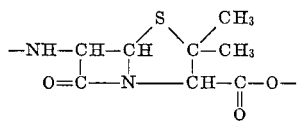

is represented simply by "—APA—."

These examples are given in illustration of, but not in limitation of, the present invention. All temperatures are in degree centigrade. "Skellysolve B" is a petroleum ether fraction of B.P. 60–68° C. consisting essentially of n-hexane.

DESCRIPTION OF THE PREFERRED EMBODIMENTS

Example 1

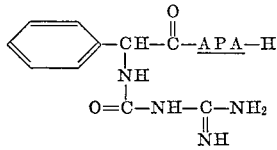

N-guanyl-N'-nitrourea (I).—To a stirred, ice-cooled mixture of 100 ml. of concentrated sulfuric acid and 40 ml. of concentrated nitric acid was added (caution!), in small portions over 40 min., 25 g. (0.3 mole) of cyanoguanidine (Eastman). After the addition was complete, the reaction mixture was kept at about 0° for 1.5 hrs. with occasional swirling, then was poured into 1000 g. of ice. The precipitate was removed by filtration and washed with water. Without drying, the precipitate was suspended in 200 ml. of water and dissolved by the addition of 10% aqueous NaOH. The resulting solution was filtered, then the product was precipitated by bubbling $CO_2$ through the solution for 1 hr. The solid was removed by filtration, washed with $H_2O$, and dried, yielding 38.6 g. (88%), M.P.>250°.

Analysis.—Calcd. for $C_2H_5N_5O_3$ (percent): C, 16.3; H, 3.43; N, 47.96. Found (percent): C, 16.63; H, 3.65; N, 47.6.

4-guanylsemicarbazide dihydrochloride (II).—A suspension of 5.88 g. (0.04 mole) of N-guanyl-N'-nitrourea in 31.8 ml. of concentrated HCl was cooled by the addition of about 15 g. of ice and storage in an ice bath. The suspension was added over 45 min. to a vigorously stirred, ice-cooled mixture of 12.96 g. (0.18 mole) of zinc dust and about 300 g. of ice. After the addition was completed, the mixture was stored for 10 min. without external cooling and then was filtered. The filtrate was shaken vigorously with 5 ml. (0.05 mole) of benzaldehyde, and the colorless precipitate which separated was quickly removed by filtration and dried under reduced pressure, yielding 3.0 g. of the benzal derivative of II, M.P. 237°.

Without purification, 3.5 g. of the benzal derivative was suspended in 5 ml. of ethanol, then 50 ml. of concentrated HCl was added and the mixture was stored at 40° for 1 hr. The insoluble crystalline product was collected by filtration and recrystallized from water-ethanol, yielding 1.0 g. of II, M.P. 191°.

6-[D(—)-α-(3-guanyl - 1 - ureido)-phenylacetamido]-penicillanic acid.—To a stirred, ice-salt cooled solution of 1.0 g. (5.25 mmoles) of 4-guanylsemicarbazide dihydrochloride in 6 ml. of $H_2O$ was added a solution of 0.366 g. (5.25 mmoles) of $NaHO_2$ in 1.4 ml. of $H_2O$. Stirring and cooling was continued for 10 min. This solution of guanylcarbamoylating agent prepared in situ was then added to a stirred, ice-cooled solution of 2.12 g. (5.25 mmoles) of ampicillin [D-α-aminobenzylpenicillin] in 7 ml. of $H_2O$ containing sufficient triethylamine to bring the pH to 7.5. After the solutions were combined, the pH was adjusted to 7.2 with triethylamine, and stirring and cooling was continued for 45 min. The precipitate which separated was collected by filtration, washed with $H_2O$, and dried, yielding 1.2 g. solid 6 - [D-α-(3-guanyl-1-ureido)-phenylacetamido]-penicillanic acids. This was reprecipitated twice by dissolving in 10 ml. of $H_2O$ with triethylamine at pH 9.5, then acidifying of pH 5 (acidification to pH 6.5 is sufficient) with 42% $H_3PO_4$, yielding 0.425 g. of 6 - [D-α-(3-guanyl-1-ureido) - phenylacetamido]-penicillanic acid, M.P. 198–200° C. dec.

Analysis.—Calc'd for $C_{18}H_{22}N_6O_5S \cdot H_2O$ (percent): C, 45.95; H, 5.57; N, 17.86. Found (percent): C, 46.65; H, 5.67; N, 17.51.

Two determinations were made for the minimum inhibitory concentrations (M.I.C.) in mcg./ml. of this product ("CMPD") and ampicillin ("AMP") versus various organisms in nutrient broth. The results were as follows:

| Organism | M.I.C. in mcg./ml. | | | |
|---|---|---|---|---|
| | CMPD | AMP | CMPD | AMP |
| D. pneumoniae plus 5% serum | ≤.02 | .008 | .008 | .008 |
| Str. pyogenes | ≤.02 | .008 | .016 | .008 |
| S. aureus Smith | .3 | .06 | .3 | .06 |
| S. aureus Smith plus 50% serum | .3 | .06 | .6 | .06 |
| S. aureus 1633-2 | 4 | 4 | 2.5 | 2 |
| Pr. morganii | 250 | 125 | 8 | 125 |
| E. coli A9675 | 16 | 125 | 8 | 125 |
| E. coli Juhl A15119 | 2 | | 1.3 | 4 |
| Sal. enteritidis | ≤1 | .13 | .08 | .13 |
| K. pneumoniae A9977 | ≤1 | .5 | .3 | .25 |
| K. pneumoniae A15130 | 63 | 125 | 63 | 125 |
| Ps. aeruginosa | 2 | 125 | 1.3 | 63 |
| Pr. mirabilis | ≤1 | .3 | .08 | .16 |

6 - [D-α-(3 - guanyl-1-ureido)-phenylacetamido]-penicillanic acid has strong absorption bands in the infrared at 3360, 1722, 1770, 1690, 1610, and 1520 cm.$^{-1}$. The region between 1650 and 1740 cm.$^{-1}$ is quite different compared to that region in the starting penicillin.

Example 2

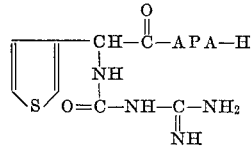

6 - [D-α-(3 - guanyl - 1-ureido)-3-thienylacetamido]-penicillanic acid.—This compound is prepared by substituting an equimolar weight of 6-(D-α-amino-3-thienylacetamido)-penicillanic acid for the ampicillin in the procedure of Example 1.

Example 3

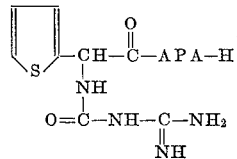

6 - [D-α-(3 - guanyl-1-ureido) - 2-thienylacetamido]-penicillanic acid.—This compound is prepared by substituting an equimolar weight of 6-(D-α-amino-2-thienyl-acetamido)-penicillanic acid for the ampicillin in the procedure of Example 1.

Example 4

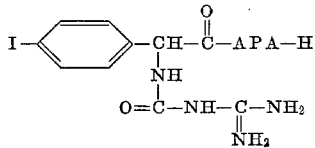

D - α - acetamido-phenylacetic acid.—A suspension of 50 g. (0.331 mole) of D-(—)-2-phenylglycine in 700 ml. of water was cooled to 0 to 5° C. and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25° C. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188° C., $[\alpha]_D^{24°} = -217.9°$ (c.=1%, ethanol).

D-α-acetamido - 4 - nitrophenylacetic acid.—D-α-acetamidophenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, d.=1.5, 9.7 ml. 0.208 mole) was added dropwise at such a rate to the stirred mixture that the salt-ice cooling bath maintained the temperature in the range 0 to —5° C. The reaction mixture was stirred at —5 to —10° C. for an additional 30 minutes and then poured onto about 300 g. of ice flakes. The white crystalline product was collected by filtration, washed with water and recrystallized three times from 1:1 95% ethanol-water; M.P. 180–182° C. dec., yield 11.5 g. (46.4%). An additional recrystallization from ethyl acetate did not change the melting point; $[\alpha]_D^{24°} = -206.4°$ (c.=5%, ethanol).

Analysis.—Calc'd for $C_{10}H_{10}N_2O_5$ (percent): C, 50.42; H, 4.23; N, 11.76. Found (percent): C, 50.14; H, 4.07; N, 11.96.

D-α-acetamido-4-aminophenylacetic acid.—A solution of 15 g. (0.063 mole) of D-α-acetamido-4-nitrophenylactic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water, weight 4.8 g., M.P. 207–209° C. dec., $$[\alpha]_D^{24°} = -182.2°$$

(c.=0.5%, 1 N HCl).

Analysis.—Calc'd for $C_{10}H_{12}N_2O_3$ (percent): C, 57.71; H, 5.81; N, 13.46. Found (percent): C, 57.61, 57.64; H, 5.67; N, 13.18.

D-α-acetamido-4-iodophenylacetic acid.—To a solution of 5.0 g. (0.024 mole) of D-α-acetamido-4-aminophenyl-acetic acid in 70 ml. of trifluoroacetic acid at —5 to 0° was added slowly 1.8 g. of sodium nitrite. The solution was stirred for 25 minutes. Solid potassium iodide (4.8 g., 0.024 mole) was added at 0 to 5°. The temperature of the dark brown mixture was increased to 30° whereupon a vigorous gas evolution occurred. The mixture was maintained at 30° for 45 minutes and then heated at reflux for one-half hour. The trifluoroacetic acid phase was decanted from the dark colored insoluble material. The trifluoroacetic acid was distilled off at reduced pressure. The residue was taken up in 50 ml. of water. After ice cooling there was obtained a precipitate of brown solid. Two recrystallizations from 1:1 95% ethanol-water gave D-α-acetamido-4-iodophenylacetic acid; M.P. 217° dec. with darkening at 202°, $[\alpha]_D^{24°} = -173.2°$ (c.=0.5, 95% ethanol).

Analysis.—Calc'd for $C_{10}H_{10}INO_3$ (percent): C, 37.64; H, 3.16; N, 4.39. Found (percent): C, 37.84; H, 3.30; N, 4.34.

The dark colored insoluble material was slurried with water and treated with 1 M sodium thiosulfate to remove the iodine color. The solid was filtered, washed with water and twice recrystallized from 1:1 95% ethanol-water with a carbon treatment giving additional product:

$$[\alpha]_D^{24°} = -170.6°$$

(c.=0.5, 95% ethanol).

Analysis.—Calc'd for $C_{10}H_{10}INO_3$ (percent): C, 37.64; H, 3.16; N, 4.39. Found (percent): C, 37.70; H, 3.25; N, 4.45.

D-α-amino-4-iodophenylacetic acid.—A suspension of 3.7 g. (0.011 mole) of D-α-acetamido-4-iodophenylacetic acid in 15 ml. of 2 N hydrochloric acid plus sufficient dioxane to give a solution at the boiling point was heated at reflux for 1.5 hours. The solvent was distilled off at reduced pressure. The residue was extracted with water, the insoluble material (solid A) being removed by filtration. The filtrate was stripped to dryness at reduced pressure and the solid residue was extracted with water, the insolubic material (solid B) again removed. The filtrate was again evaporated to dryness and the residue extracted with water and the insoluble material (solid C) again removed. The filtrate was stripped to dryness giving solid D as residue. The infrared spectra (KBr) showed solids A and B to be amino acid zwitter ion and solid C to be mostly amino acid hydrochloride.

Solid A was hydrolyzed in 2.5 N hydrochloric acid plus dioxane for 1.75 hours. The solution was evaporated to dryness, the residue taken up in water, a small amount of insoluble material removed by filtration, and the filtrate evaporated to dryness leaving solid E. An infrared spectrum (KBr) showed solid E to be a mixture of amino acid hydrochloride and zwitter ion.

Solids D and E were combined in water and the system adjusted to pH 4.5 giving 1.55 g. of D-α-amino-4-iodophenylacetic acid; M.P. 204–205° dec., $$[\alpha]_D^{24°} = -99.4°$$

(c.=0.5, 1 N HCl).

Analysis.—Calc'd for $C_8H_8INO_2$ (percent): C, 34.68; H, 2.91; N, 5.06. Found (percent): C, 34.63; H, 3.24; N, 4.77.

D - α-amino-4-iodophenylacetic acid.—D-α-acetamidophenylacetic acid (Beil. 14, 591) (200 g., 1.036 mole) was added slowly to a solution of 161.6 g. (0.52 mole) of silver sulfate in 1.2 l. of conc. sulfuric acid with cooling as needed to keep the temperature below 30°. Finely pulverized iodine (684 g., 2.7 mole) was added in portions during 1.5 hours. The mixture was stirred at room temperature for 1.5 hours longer. The mixture was filtered through a sintered glass filter and the filtrate poured into ca. 3 l. of crushed ice. The solid was filtered, washed with water, and air dried. The material was recrystallized from 650 ml. of 2-propanol (the hot solution was filtered to remove some insoluble material) giving solid A; yield 46.6 g., M.P. 175–183° dec. The filtrate was concentrated and stored in the cold overnight giving solid B; yield 132 g., M.P. 160–168°. Solids A and B were crude D-α-acetamido-4-iodophenylacetic acid.

Solid B was combined with 500 ml. of 2 N hydrochloric acid and refluxed for one hour. The insoluble material (solid C) was removed by filtration and washed with water; yield 100 g., M.P. 180–183°.

Solid C was hydrolyzed in 200 ml. of 2 N hydrochloric acid plus enough dioxane to solubilize the material. After 2.25 hours at reflux the solvent was distilled off at reduced pressure and the residue extracted with 250 ml. of water. The insoluble material (solid D) was removed by filtration. The filtrate was adjusted to pH 4.5 and after cooling in an ice bath the precipitate was filtered, washed with water, and triturated with boiling 95% ethanol giving 10.8 g. of D-α-amino-4-iodophenylacetic acid.

Solid A was hydrolyzed in 2 N hydrochloric acid plus dioxane for two hours and the solvent distilled off at reduced pressure. The residue was extracted with water. The insoluble material (solid F) was removed by filtration. The filtrate was adjusted to pH 4.5 giving crystalline D-α-amino-4-iodophenylacetic acid; yield 14.4 g., $[\alpha]_D^{24°} = -86.2°$ (c.=0.5, 1 N HCl).

Solids D and F were combined and suspended in 350 ml. of water. The suspension was adjusted to pH 4.5 with 20% sodium hydroxide. The solid was filtered, washed with water, air dried, and triturated with 300 ml. of boiling 95% ethanol giving 42.5 g. of D-α-amino-4-iodophenylacetic acid; $[\alpha]_D^{24°} = -99.8°$ (c.=0.5, 1 N HCl).

D-α-amino-4-iodophenylacetyl chloride hydrochloride.—A suspension of 42.3 g. (0.15 mole) of finely ground D-α-amino-4-iodophenylacetic acid in 1.5 l. of methylene chloride was gassed at 0 to 5° with anhydrous hydrogen chloride and 40.6 g. (0.195 mole) of phosphorus pentachloride added. The mixture was stirred for two hours at 5°. Skellysolve B (800 ml.) was added to the reaction mixture and the product collected by filtration. The product was washed with Skellysolve B and dried in vacuo; yield 40.9 g. (82%).

6-(D-α-amino-4-iodophenylacetamido)penicillanic acid.—A suspension of 26.5 g. (0.123 mole) of 6-aminopenicillanic acid in 300 ml. of water at 5° was brought into solution by adjusting to pH 7.0–7.2 with 10% sodium hydroxide. Acetone (1360 ml.), which had been cooled to 0 to 5°, was added and the solution adjusted to pH 2.5–3.3 with 6 N hydrochloric acid. D-α-amino-4-iodophenylacetyl chloride hydrochloride (40.9 g., 0.123 mole) was added gradually at 0 to 5° while 10% sodium hydroxide was added as needed to maintain the mixture at pH 2.0–2.8. After the addition was complete the mixture was adjusted to pH 2.9 and stirred for five minutes. After adding 3.6 l. of methyl isobutyl ketone (MIBK) the aqueous phase was separated and the MIBK phase extracted with 360 ml. of water. The aqueous phases were combined and adjusted to pH 4.5 with 10% sodium hydroxide causing the product to crystallize. The product was collected by filtration (filtrate retained) and washed with water and acetone (crop A); yield 14.4 g., M.P. 191–195° dec. The combined aqueous and acetone washings from crop A were concentrated to remove acetone giving crop B; 4.0 g., M.P. 191–195° dec. The aqueous filtrate from crop A was concentrated giving crop C; 11.7 g., M.P. 191–195° dec. The infrared and nuclear magnetic resonance spectra for the three crops were consistent with 6-(D-α-amino-4-iodophenylacetamido)penicillanic acid.

*Analysis.*—Calc'd for $C_{16}H_{18}IN_3O_4S \cdot 3H_2O$ (percent): C, 36.30; H, 4.57; N, 7.94. Found (percent): C, 36.88; H, 4.19; N, 7.09.

6-[D-α-(3-guanyl-1-ureido)-4-iodophenylacetamido]penicillanic acid.—This compound is prepared by substituting an equimolar weight of 6-(D-α-amino-4-iodophenylacetamido)penicillanic acid for the ampicillin in the procedure of Example 1.

Example 5

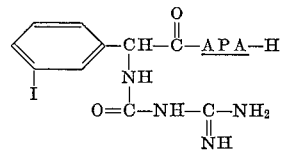

D-α-acetamido-3-iodophenylacetic acid.—To a solution of 50.0 g. (0.24 mole) of D-α-acetamido-3-aminophenylacetic acid in 550 ml. of trifluoroacetic acid at −5° was added 17.0 g. of 97% sodium nitrite gradually during 10 minutes. The solution was stirred at −5° for 25 minutes longer. The diazonium salt solution was added in a steady stream to a vigorously stirred suspension of 79.0 g. of potassium iodide and 2.5 g. of iodine in 300 ml. of trifluoroacetic acid initially at 23°. During the addition the temperature rose to 25–27° and steady gas evolution was noted. The mixture was stirred for 3.5 hours at room temperature until the gas evolution ceased. The reaction mixture was filtered leaving a quantity of dark gummy solid. The filtrate was concentrated to a small volume, water added, and further concentrated. The concentrate containing a solid was treated with dilute sodium thiosulfate and the solid collected by filtration. Recrystallization from 4:1 water −95% ethanol gave 19.5 g. of D-α-acetamido-3-iodophenylacetic acid; M.P. 181–181.5°, $[\alpha]_D^{24°} = -158.0°$ (c.=0.5, 95% ethanol).

*Analysis.*—Calc'd for $C_{10}H_{10}INO_3$ (percent): C, 37.64; H, 3.16; N, 4.39; I, 39.77. Found (percent): C, 37.80; H, 3.07; N, 4.55; I, 39.20.

D-α-amino-3-iodophenylacetic acid.—D-α-acetamido-3-iodophenylacetic acid (10.0 g.) in 45 ml. of 2 N hydrochloric acid plus sufficient dioxane to give a solution at the boiling point was refluxed for 2.25 hours. The solvent was evaporated to dryness and the residue extracted with water. The insoluble material (solid A) was removed by filtration. The filtrate was evaporated to dryness and the residue in water was adjusted to pH 4.5 with sodium hydroxide giving 1.0 g. of D-α-amino-3-iodophenylacetic acid; M.P. 192–195°, $[\alpha]_D^{24°} = -81°$ (c.=0.5, 1 N HCl).

The filtrate deposited a second crop of amino acid on storage in the cold; yield 0.6 g., M.P. 203–204.5°, $$[\alpha]_D^{24°} = -101.4°$$

(c.=0.5, 1 N HCl).

Solid A (which was chiefly amide) was hydrolyzed with 45 ml. 2 N hydrochloric acid plus dioxane for two hours at reflux. The residue remaining after evaporation of the solvent was combined with water and again evaporated to dryness. The residue in water was adjusted to pH 4.5 giving 1.9 g. of D-α-amino-3-iodophenylacetic acid; M.P. 196–199°, $[\alpha]_D^{24°} = -95°$ (c.=0.5, 1 N HCl).

The infrared and nuclear magnetic resonance spectra of the three fractions were consistent with the desired product.

D-α-amino-3-iodophenylacetyl chloride hydrochloride.—A suspension of 2.5 g. (0.009 mole) of D-α-amino-3-iodophenylacetic acid in 100 ml. of methylene chloride at 0 to 5° was gassed with anhydrous hydrogen chloride and 2.5 g. (0.012 mole) of phosphorus pentachloride added. After stirring for 24 hours at 0 to 5° an additional 1.2 g. of phosphorus pentachloride was added and stirring continued for a total of 38 hours. The reaction mixture was diluted with Skellysolve B, the product filtered, washed with Skellysolve B, and dried in vacuo; yield 1.2 g.

6-(D-α-amino-3-iodophenylacetamido)penicillanic acid.—A suspension of 0.9 g. of 6-aminopenicillanic acid in 18 ml. of water at 5° was adjusted to pH 7.0–7.2 with 10% sodium hydroxide giving a solution. Acetone (72 ml.) which had been cooled to 5° was added and the solution adjusted to pH 2.5–3.3 with 6 N hydrochloric acid. D-α-amino-3-iodophenylacetyl chloride hydrochloride (1.2 g.) was added slowly while 10% sodium hydroxide was added as needed to maintain the mixture at pH 2.0–2.5. After the addition of the acid chloride was complete the mixture was adjusted to pH 2.9 and stirring continued for five minutes at 0 to 5°. Additional water (18 ml.) and methyl isobutyl ketone (MIBK) were added. The aqueous phase was separated. The MIBK phase was extracted with 35 ml. of water. The combined aqueous solutions were adjusted to pH 4.5 with 10% sodium hydroxide causing the product to crystallize. Concentration of the filtrate after removal of the first crop gave a second crop of product; yield both crops, 975 mg., M.P. 188–194° dec.

*Analysis.*—Calc'd for $C_{16}H_{18}IN_3O_4S \cdot 3H_2O$ (percent): C, 36.30; H, 4.57; N, 7.94; I, 23.98. Found (percent): C, 36.35; H, 4.45; N, 7.87; I, 24.15.

6 - [D - α - (3 - guanyl - 1 - ureido) - 3 - iodophenylacetamido]penicillanic acid.—The compound is produced by substitution of an equimolar weight of 6-(D-α-amino-3-iodophenylacetamido)penicillanic acid for ampicillin in the procedure of Example 1.

Example 6

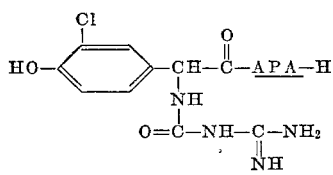

D-(—)-α-amino-α-(3 - chloro-4 - hydroxyphenyl)glycine.—To a stirred suspension of 5.01 g. (0.03 mole) of D-(—)-2-(p-hydroxyphenyl)glycine in 100 ml. of glacial acetic acid was bubbled in HCl gas at a vigorous rate for about 5 minutes. At first a clear solution resulted and then the hydrochloride salt crystallized out. Next, 4.45 g. (0.033 mole) of sulfuryl chloride (freshly distilled) in 25 ml. of glacial acetic acid was added, with stirring, over a 30 minute period, dropwise. The temperature was 26°–27° C. throughout the addition. After one hour stirring, 250 ml. of dry ether was added slowly and crystallization began. After 15 min. the product was filtered off, washed with dry ether and air dried. The 7 g. obtained was dissolved in 50 ml. of 1 N HCl, filtered, and the pH adjusted, with cooling to 5 with conc. $NH_4OH$. The resulting crystalline product was filtered off after 5 min. standing, washed with two 20 ml. portions of water and 5× with acetone. The vacuum dried material weighed 4.6 g.; dec. pt. 217° C. (sharp). The NMR and IR spectra were consistent with the desired structure. $[\alpha]_D^{22°}$ C. —137.1° (c.=1%, 1 NCl).

*Analysis.*—Calc'd for $C_8H_8ClNO_3$ (percent): C, 47.76; H, 4.01; Cl, 17.66. Found (percent): C, 47.16; H, 3.92; Cl, 17.96.

Sodium D-(—)-N-(2 - hydroxy - 1 - napthylmethylene)-α-amino-α-(3 - chloro - 4 - hydroxyphenyl) - acetate.—To a stirred solution of 8 g. (0.04 mole) of D-(—)-2-(3-chloro - 4 - hydroxyphenyl)-glycine, 25 ml. $H_2O$, 10 ml. ethanol, and 1.6 g. (0.04 mole) of sodium hydroxide was added, all at once, a warm solution of 7.57 g. (0.044 mole) of 2-hydroxy-1-naphthaldehyde (Aldrich Chemical Company) in 40 ml. of 95% ethanol. The mixture was heated until an initial precipitate redissolved and then was rapidly cooled to about 5° C. and scratched. After cooling one hour in the ice bath the crystalline product was filtered off and air dried. The bright yellow product was recrystallized from 80% ethanol-20% water to give 10.1 g. of vacuum dried product. The infrared and NMR spectra were entirely consistent with the desired structure.

*Analysis.*—Calc'd for $C_{19}H_{13}ClNO_4Na$ (percent): C, 60.37; H, 3.47. Found (percent): C, 60.66; H, 3.72.

6 - [D - 2,2 - dimethyl - 4-(3-chloro-4-hydroxyphenyl)-5 - oxo - 2(H) - 1 - imidazolidinyl]-penicillanic acid.—To a stirred and cooled (—10° C.) suspension of 3.78 g. (0.01 mole) of sodium D-(—)-N-(2-hydroxy-1-napthyl-methylene)-α-amino-α-(3 - chloro - 4 - hydroxyphenyl)-acetate in 100 ml. of acetone, 5 ml. of p-dioxane and 3 drops of pyridine was added 1.08 g. (0.01 mole) of ethyl chloroformate (EKC). The mixture was stirred at —10° C. for 30 minutes and then cooled to —40° C. and filtered to remove the sodium chloride which precipitated. To this filtrate of the mixed anhydride, vigorously stirred at —15° C., was added all at once, a precooled (0° C.) solution of 2.16 g. (0.01 mole) of 6-aminopenicillanic acid, 1.68 g. (0.02 mole) of $NaHCO_3$ in 50 ml. of water. There was vigorous $CO_2$ evolution for about 5 minutes. The temperature was kept at or below —10° C. for 20 minutes and then allowed to come to room temperature (22° C.) over a 30 minute period. To this solution was added 50 ml. of water and the acetone removed under reduced pressure at 20° C. Two 200 ml. ether extracts were taken and discarded. The aqueous layer was then adjusted to pH 2 with 6 N HCl with sufficient acetone added to keep everything in solution. This solution was allowed to stand 30 minutes at 22° C. and then two 300 ml. ether extracts were taken and discarded. The pH was readjusted to 4.7 with 20% NaOH and concentrated under reduced pressure to a volume of 25 ml. at 20° C. A small amount of insoluble material was filtered off and 25 ml. acetone added to the filtrate. The pH was then adjusted to 8.8 with 20% NaOH and after 3 hours the pH was adjusted to 3 with 40% $H_3PO_4$ and two 100 ml. ethyl acetate extracts taken. The combined ethyl acetate extracts were washed once with 20 ml. $H_2O$ and then filtered and concentrated under reduced pressure at 15° C. to a volume of about 20 ml. The crystalline product was filtered off and slurried in 10 ml. of acetone-water (1:1 by volume) for 10 minutes and filtered again.

The yield was 280 mg. of product decomposing at 182° C. and having IR and NMR spectra entirely consistent with the proposed structure.

*Analysis.*—Calc'd for $C_{19}H_{22}ClN_3O_5$ (percent): C, 51.82; H, 5.04. Found (percent): C, 48.39; H, 5.28.

To a stirred suspension of 600 mg. of 6-[D-2,2-dimethyl - 4 - (3 - chloro-4-hydroxyphenyl)-5-oxo-2(H)-1-imidazolidinyl]penicillanic acid in 5 ml. water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over $P_2O_5$, yielding 102 mg. of the product 6-[D-α-amino-α-(3-chloro-4-hydroxyphenyl)-acetamido]-penicillanic acid. The infrared spectrum is consistent with the proposed structure.

6 - [D - α - (3-guanyl-1-ureido)-3-chloro-4-hydroxyphenylacetamido]penicillanic acid.—This product is prepared by substituting an equimolar weight of 6-[D-α-amino-α-(3-chloro-4 - hydroxyphenyl)acetamido]penicillanic acid for the ampicillin in the procedure of Example 1.

Example 7

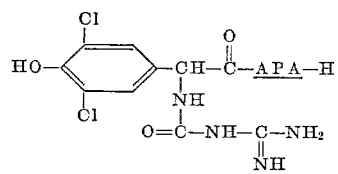

dl-2-(p-methoxyphenyl)-glycine.—To a stirred solution of 19.6 g. (0.4 mole) of NaCN in 80 ml. of $H_2O$ was added 23.6 g. (0.450 mole) of $NH_4Cl$ and 20 ml. of conc. $NH_4OH$ followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of $H_2O$ and then 240 ml. of 6 N HCl added with good mixing and the MIBK was removed in vacuo. The resulting slurry was heated at reflux (now in solution) for two hours. One hundred ml. of $H_2O$ was added to the hot solution and then 8 g. of decolorizing carbon added and after ten minutes at gentle reflux the carbon was filtered off and washed with 50 ml. of hot water. The combined filtrates (hot) were stirred and treated with conc. $NH_4OH$ until pH 5–6 was obtained (pH paper). The slurry was then cooled to 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6 N HCl with cooling. After one hour the product was filtered off, washed with $3 \times 100$ ml. $H_2O$ and air dried. Yield 40 g.; dec. 244° C. with sublimation of 230° C.

dl-2-(p-methoxyphenyl)-N-(chloroacetyl) glycine.—To a stirred suspension of 36 g. (0.2 mole) of dl-2-(p-methoxyphenyl)-glycine in 500 ml. of $H_2O$ was added 8 g. (0.2 mole of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of $H_2O$ was added over a 10 to 15 minute period. More 20% NaOH was added as needed to keep the pH at about 9 for a 1.5 hour period. Next, the pH was adjusted to 2 with 40% $H_3PO_4$. The product crystallized immediately and was filtered off, washed with water and recrystallized from ethanol-water to give 38 g. of product melting at 182°–183° C.

Analysis.—Calc'd for $C_{11}H_{12}ClNO_4$ (percent): C, 51.21; H, 4.69. Found (percent): C, 51.49; H, 4.90.

D-(−) - 2 - (p-methoxyphenyl)-N-chloroacetylglycine and L-(+)-2-(p-methoxyphenyl)-glycine.—To 800 ml. of $H_2O$ stirred at 37° C. was added 38 g. (0.148 mole) of dl - 2 - (p - methoxyphenyl)-N-chloroacetylglycine and $NH_4OH$ added dropwise until pH 7.8 was obtained. To the resulting solution was added 2 g. of hog kidney acylase (Sigma Chemical Company) and stirring continued at 37° C. (internal) for 21 hours. The solids containing crude L-(+)-2-(p-methoxyphenyl)-glycine were then filtered off and washed with $2 \times 100$ ml. $H_2O$ and the pH of the combined filtrates adjusted to 4–5 with glacial acetic acid. The solution was heated on the steam bath for 30 min. with 5 g. of decolorizing carbon and then filtered. The carbon cake was washed with 50 ml. of warm water and the combined filtrates cooled and acidified to pH 2 with 40% $H_3PO_4$. After one hour cooling at 0° C. the crystalline product was filtered off and washed with cold water (3×) and air dried. The yield was 16 g. D-(−)-2-(p-methoxyphenyl) - N - chloroacetylglycine and when a second run using 5× the above amounts were used a yield of 83 g. (87% yield) was obtained. M.P. 170°–171° C.; $[\alpha]_D^{25°}$ C.—193° (c.=1%, ethanol).

Analysis.—Calc'd for $C_{11}H_{12}ClNO_4$ (percent): C, 51.21; H, 4.69. Found (percent): C, 51.50; H, 4.99.

When the solids containing crude L-(+)-2-(p-methoxyphenyl)-glycine are treated with hot 3 N HCl (200 ml.) and carbon followed by filtration and pH adjustment to 5.5 there is obtained 6 g. (first run) of pure L-(+)-2-(p-methoxyphenyl)glycine. $[\alpha]_D^{25°}$ C.+150.4° (c.=1%, 1NHCl).

D-(−)-2-(p-methoxyphenyl)-glycine.—The 16 g. of D-(−)-2-(p-methoxyphenyl)-N-chloroacetylglycine was refluxed 1.5 hours in 170 ml. of 2 N HCl. The resulting clear solution was filtered and cooled at 5° C. and the pH adjusted to 5.5 with $NH_4OH$.

The product was then filtered off after cooling 30 min. and washed with $3 \times 25$ ml. of cold water. The dried material D-(−)-2-(p-methoxyphenyl)-glycine weighed 9.5 g. A second run gas 54 g.

$[\alpha]_D^{25°}$ C.—149.9° (c.=1%, 1 N HCl) (first run)
$[\alpha]_D^{25°}$ C.—148.1° (c.=1%, 1 N HCl) (second run)

Analysis.—Calc'd for $C_9H_{11}NO_3$ (percent): C, 59.67; H, 6.13; N, 7.74. Found (percent): C, 59.38; H, 6.16; N, 8.00.

D-(−)-2-(p - hydroxyphenyl)-glycine.—A mixture of 1.81 g. (0.01 mole) of D-(−)-2-p-methoxyphenyl)glycine ($[\alpha]_D^{25°}$ C.—149.9° c.=1%, 1 N HCl) and 10 ml. of 48% HBr was heated at gentle reflux for 2 hours. The resulting solution was concentrated at reduced pressure at 30° C. to a wet solid. A minimum amount of water (20° C.) was added to dissolve the HBr salt and with cooling $NH_4OH$ was added to pH 5. The resulting thick gel which ppt. was warmed to 50° C. and when solution was nearly obtained a different crystalline form began to ppt. Upon cooling 30 min. at 0°–5° C. there was obtained 990 mg. of cold water washed ($3 \times 1$ ml.) and air dried material, D-(−)-2-(p-hydroxyphenyl)-glycine. $[\alpha]_D^{25°}$ C. —161.2° (c.=1%, 1 N HCl) dec. pt. 223° C. A second run using 20× the above amounts gave 24.5 g. of material. $[\alpha]_D^{25°}$ C.—153° (c.=1%, 1 N HCl).

Analysis.—Calc'd for $C_8H_9NO_3$ (percent): C, 57.49; H, 5.43; N, 8.39. Found (percent): C, 57.41; H, 5.67; N, 8.39.

D-(−)-2-(3,5-dichloro - 4 - hydroxyphenyl)-glycine.— To a stirred suspension of 5.01 g. (0.03 mole) of D-(−)- 2-(4-hydroxyphenyl)glycine in 100 ml. of glacial acetic acid was bubbled in HCl gas at a vigorous rate for about 5 minutes. At first a clear solution resulted and then the hydrochloride salt crystallized out. Next, 9.0 g. (0.067 mole) of sulfuryl chloride (freshly distilled) in 25 ml. of glacial acetic acid was added, with stirring, over a 30 minute period, dropwise. The temperature was 26°–27° C. throughout the addition. After the sulfuryl chloride addition, the slurry was heated to 70° C. for 30 minutes and then stirred at ambient temperature for two hours. Then 250 ml. of dry ether was added slowly and crystallization began. After 15 min. the product was filtered off, washed with dry ether and air dried. The 7 g. obtained was dissolved in 100 ml. of 1 N HCl, filtered, and the pH adjusted, with cooling to 5 with conc. $NH_4OH$. The resulting crystalline product was filtered off after 5 min. standing, washed with two 20 ml. portions of water and 5× with acetone. The vacuum dried material weighed 4.5 g.; dec. pt. 210° C. (sharp). The NMR and IR spectra were consistent with the desired structure. $[\alpha]_D^{22°}$ C. —126.3° (c.=1%. 1 N CHl).

Analysis.—Calc'd for $C_8H_7Cl_2NO_3$ (percent): C, 40.78; H, 2.99; Cl, 30.04. Found (percent): C, 41.85; H, 3.22; Cl, 27.80.

Sodium D-(−) - N - (2 - hydroxy - 1 - napthylmethylene) - 2 - amino - 2 - (3,5-dichloro-4-hydroxyphenyl)- acetate.—To a stirred solution of 1.6 g. (0.04 mole) of D-(−)-2-(3,5-dichloro-4-hydroxyphenyl)-glycine 25 ml. $H_2O$, 10 ml. ethanol, and 1.6 g. (0.04 mole) of sodium hydroxide is added, all at once, a warm solution of 7.57 g. (0.044 mole) of 2-hydroxy-1-napthaldehyde (Aldrich Chemical Company) in 40 ml. of 95% ethanol. The mixture is heated until an initial precipitate redissolves and then is rapidly cooled to about 5° C. and scratched. After cooling one hour in the ice bath the crystalline product is filtered off and air dried. The infrared and NMR spectra are entirely consistent with the desired structure.

6-[D-2,2 dimethyl-4-(3,5 - dichloro-4-hydroxyphenyl)- 5 - oxo - 1 - imidazolidinyl]penicillanic acid.—To a stirred and cooled (−10° C.) suspension of 1.08 g. (0.01 mole) of sodium D-(−)-N-(2 - hydroxy-1-napthylmethylene)- α-amino-α-(3,5 - dichloro - 4 - hydroxyphenyl) acetate in 100 ml. of acetone, 5 ml. of p-dioxane and 3 drops of pyridine is added 1.08 g. (0.01 mole) of ethyl chloroformate (EKC). The mixture is stirred at −10° C. for 30 minutes and then cooled to −40° C. and filtered to remove the sodium chloride which precipitated. To this filtrate of the mixed anhydride, vigorously stirred at −15° C. is added, all at once, a precooled (0° C.) solution of 2.16 g. (0.01 mole) of 6-aminopenicillanic acid, 1.68 g. (0.02 mole) of NaHCO₃ in 50 ml. of water. There is vigorous $CO_2$ evolution for about 5 minutes. The temperature is kept at or below −10° C. for 20 minutes and then allowed to come to room temperature (22° C.) over a 30 minute period. To this solution is added 50 ml. of water and the acetone removed under pressure at 20° C. Two ml. ether extracts are taken and discarded. The aqueous layer is then adjusted to pH 2 with 6 N HCl with sufficient acetone added to keep everything in solution. This solution is allowed to stand 30 minutes at 22° C. and then two 300 ml. ether extracts are taken and discarded. The pH is readjusted to 4.7 with 20% NaOH and concentrated under reduced pressure to a volume of 25 ml. at 20° C. A small amount of insoluble material is filtered off and 25 ml. acetone added to the filtrate. The pH is then adjusted to 8.8 with 20% NaOH and the resulting solution let stand at 10° C. for 5 hours. The pH is adjusted to 3 with 40% $H_3PO_4$ and two 100 ml. ethyl acetate extracts taken. The combined ethyl acetate extracts are washed once with 20 ml. $H_2O$ and then filtered and concentrated under reduced pressure at 15° C. to a volume of about 20 ml. The crystalline product is filtered off and slurried in 10 ml. of acetone-water (1:1 by volume) for 10 minutes and filtered again.

The product obtained in 6-[D-2,2-dimethyl-4-(3,5-dichloro - 4 - hydroxyphenyl) 5 - oxo - 1 - imidazolidinyl] penicillanic acid and has IR and NMR spectra entirely consistent with the proposed structure.

6-[D-α-amino - α - (3,5 - dichloro - 4 - hydroxyphenyl)-acetamido]penicillanic acid.—To a stirred suspension of 600 mg. of 6-[D - 2,2 - dimethyl - 4 - (3,5 - dichloro-4-hydroxyphenyl) - 5 - oxo - 1 - imidazolidinyl]-penicillanic acid in 5 ml. of water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over $P_2O_5$, yielding the product 6 - [D - α - amino - α - (3,5 - dichloro - 4 - hydroxyphenyl)-acetamido]-penicillanic acid. The infrared spectrum is consistent with the proposed structure.

6 - [D - α - (3 - guanyl - 1 - ureido) - 3,5 - dichloro-4-hydroxyphenylacetamido]penicillanic acid.—This product is prepared by substituting an equimolar weight of 6-[D-α-amino-α-(3,5-dichloro - 4 - hydroxyphenyl)-acetamido] penicillanic acid for the ampicillin in the procedure of Example 1.

Example 8

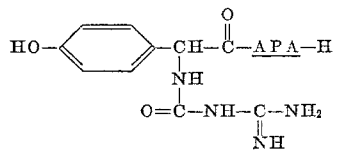

6-[D-α-(3-guanyl-1-ureido) - 4 - hydroxyphenyl-acetamido]penicillanic acid.—This product is prepared by substituting for the ampicillin in the procedure of Example 1 an equimolar weight of 6-[D - α - amino-α-(4-hydroxyphenyl)-acetamido]penicillanic acid which is prepared from D-α-(4-hydroxyphenyl)glycine, as by the methods known in the art and that given above for D-α-(3,5-dichloro-4-hydroxyphenyl)glycine and D-α-amino - 4 - iodophenylacetic acid [also called D-α-(4-iodophenyl)glycine].

Example 9

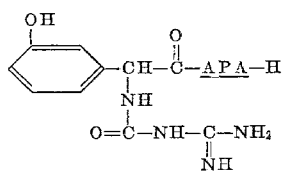

6-[D-α-(3-guanyl - 1 - ureido) - 3 - hydroxyphenyl-acetamido]penicillanic acid.—This product is prepared by substituting for the ampicillin in the procedure of Example 1 an equimolar weight of 6-[D-α-amino-α-(3-hydroxyphenyl)acetamido]penicillanic acid which is prepared from D-α-(3-hydroxyphenyl)glycine, as by the methods known to the art, e.g., British Pat. 991,586, and those illustrated above for D-α-(3,5-dichloro-4-hydroxyphenyl)glycine and D-α-(4-iodophenyl)glycine.

D-α-(3-hydroxyphenyl)glycine is prepared by the methods known to the art and also, preferably, by the following procedures:

(1) Resolution of DL-α-amino - 3 - methoxyphenylacetic acid.—DL-α-amino - 3 - methoxyphenylacetic acid [A. H. Neims, D. C. DeLuca, L. Hellerman, Biochemistry, 5(1), 203 (1966)] was resolved with d-10-camphorsulfonic acid in water.

DL-α-amino - 3 - methoxyphenylacetic acid (33.1 g., 0.182 mole) was added to a solution of 46.4 g. (0.2 mole) of d-10-camphorsulfonic acid in 135 ml. of water at 50 to 60°. The solution was filtered and stored in the cold for 20 hours. The precipitated amino acid d-10-camphorsulfonate salt was collected by filtration. The salt was repeatedly recrystallized from water until a sample of the amino acid regenerated from it showed no further change in optical rotation. Thus, after three recrystallizations from water, there was obtained 3.7 g. of the d-10-camphorsulfonate salt of D-α-amino-3-methoxyphenylacetic acid; M.P. 184–185° dec. The salt (1.4 g.) was dissolved in about 10 ml. of water by warming. The solution was adjusted to pH 5–6 with concentrated ammonium hydroxide. The product was allowed to crystallize first at room temperature and then in an ice bath giving, after filtration and drying in vacuo over phosphorus pentoxide, 0.36 g. of D-α-amino - 3 - methoxyphenylacetic acid; M.P. 178–181° dec., $[α]_D^{24°}=−129.0°$ (c=0.5, 1 N HCl). A portion of the amino acid was recrystallized from water and dried in vacuo over phosphorus pentoxide; M.P. 180–182° dec., $[α]_D^{24°}=−136°$ (c.=0.08, 1 N HCl).

Analysis.—Calc'd for $C_9H_{11}NO_3 \cdot ⅓H_2O$ (percent): C, 57.74; H, 6.28; N, 7.48. Found (percent): C, 57.70, 57.76; H, 6.23, 6.18; N, 7.21.

D-α-amino-3 - hydroxyphenylacetic acid hydrobromide monohydrate.—D-α-amino - 3 - methoxyphenylacetic acid (2.9 g., 0.016 mole) and 16 ml. of 48% hydrobromic acid were refluxed for two hours. The volatile materials were removed at reduced pressure. Water (about 15 ml.) was added to the residue and this removed at reduced pressure. This was repeated once. The residue was dried in vacuo to remove all water. The dried residue was recrystallized by dissolving in 2-propanol and adding Skellysolve B to the cloud point. After drying there was obtained 3.0 g. of D-α-amino - 3 - hydroxyphenylacetic acid hydrobromide monohydrate; M.P. 156–162° dec. $[α]_D^{24°}=−62°$ (c.=0.1, water). The infrared and nuclear magnetic resonance spectra were consistent with the desired product.

Analysis.—Calc'd for $C_8H_9NO_3 \cdot HBr \cdot H_2O$ (percent): C, 36.10; H, 4.55; N, 5.26. Found (percent): C, 37.03; H, 5.12; N, 5.34.

(2) D-α-acetamido - 3 - nitrophenylactic acid.—A stirred suspension of 49.8 g. (0.254 mole) of D-α-amino-3-nitrophenylactic acid [P. Fries, K. Kjaer, Acta Chimica Scand., 17, 2391 (1963)] in 500 ml. of water was cooled in an ice bath and a solution of 8.36 g. (0.209 mole) of NaOH in 40 ml. of water was added causing most of the solid to dissolve. There was immediately added 42.7 g.

(0.418 mole) of acetic anhydride followed by the addition as needed of a solution of 25.1 g. (0.627 mole) of sodium hydroxide to maintain the pH value at about 7. The reaction mixture was stirred in the ice bath for an additional 15 minutes, filtered, and adjusted to pH 1.8 with concentrated hydrochloric acid. The crystalline product was collected by filtration and washed with water; yield 25 g., M.P. 172–174° dec. The product was twice recrystallized from 1:1 95% ethanol-water giving, after drying in vacuo over phosphorus pentoxide, 11.8 g. of D-α-acetamido-3-nitrophenylacetic acid, M.P. 183–185°; $[\alpha]_D^{24°}=-179.4°$ (c.=0.5, 95% ethanol). The infrared and nuclear magnetic resonance spectra were consistent with the desired compound.

*Analysis.*—Calc'd for $C_{10}H_{10}N_2O_5$ (percent): C, 50.42; H, 4.23; N, 11.76. Found (percent): C, 50.56; H, 4.20; N, 11.73.

D-α-acetamido - 3 - aminophenylacetic acid.—A solution of 9 g. (0.0378 mole) of D-α-acetamido - 3 - nitrophenylacetic acid in 150 ml. of methanol was hydrogenated using 0.6 g. of 5% palladium on carbon at an initial pressure of 50 p.s.i. on a Paar hydrogenation apparatus for 30 minutes. The hydrogenation bottle was cooled with a jet of air to keep the temperature under 40°. The catalyst was removed by filtration. Evaporation of the filtrate gave a crystalline product. Two recrystallizations from 1-propanol gave 3.4 g. of D-α-acetamido - 3 - aminophenylacetic acid, M.P. 200–201° dec.; $[\alpha]_D^{24°}=-174.4°$ (c.=0.5, water).

*Analysis.*—Calc'd for $C_{10}H_{12}N_2O_3$ (percent): C, 57.71; H, 5.81; N, 13.46. Found (percent): C, 57.78; H, 5.97; N, 13.35.

D-α-amino-3-hydroxyphenylacetic acid.—A solution of 2.1 g. (0.01 mole) of D-α-acetamido-3-aminophenylacetic acid in 35 ml. of trifluoroacetic acid was cooled to —5° and 0.69 g. (0.01 mole) of solid sodium nitrite added. After stirring for 20 minutes at —5° acetic acid (5 ml.) was added. The mixture was stirred at 45 to 50° for one and one-half hours and then heated on the steam bath for one-half hour. The cold reaction mixture was poured onto 30 g. of crushed ice. The volatile materials were distilled at reduced pressure leaving as residue a slightly brown viscous oil. The residue was combined with 30 ml. of 2 N hydrochloric acid and refluxed for one and one-half hours. The volatile materials were removed under reduced pressure. Water was added to the residue and this removed under reduced pressure causing the hydrochloride salt of the product to crystallize. The residue was dissolved in a minimum amount of water, adjusted to pH 4.5 with 20% sodium hydroxide, filtered, and stored in the cold giving 0.43 g. of crystalline D-α-amino-3-hydroxyphenylacetic acid, M.P. 204–206° dec. The filtrate was stripped to dryness and a small amount of water added to the crystalline residue giving a 2nd crop (0.46 g.) of the amino acid.

The filtrate from the 2nd crop plus 3 ml. of concentrated hydrochloric acid were concentrated to dryness. The residue was dissolved in a small amount of water by warming, cooling gave crystalline D-α-amino-3-hydroxyphenylacetic acid hydrochloride monohydrate; yield 0.5 g., M.P. 150–153° dec., $[\alpha]_D^{24°}=-91.2°$ (c.=0.5, water). The infrared and nuclear magnetic resonance spectra were consistent with the desired product.

*Analysis.*—Calc'd for $C_8H_9NO_3 \cdot HCl \cdot H_2O$ (percent): C, 43.35; H, 5.46; N, 6.32. Found (percent): C, 42.7; H, 5.6; N, 6.17; residue, 1.45. Values corrected for 1.45% residue: C, 43.3; H, 5.7; N, 6.26.

The two crops of D-α-amino-3-hydroxyphenylacetic acid were combined, suspended in a small amount of water, 2 ml. of 48% hydrobromic acid added and the filtered solution evaporated to dryness. The residue was twice recrystallized from water giving 150 mg. of D-α-amino-3-hydroxyphenylacetic acid hydrobromide monohydrate; M.P. 172–175° dec., $[\alpha]_D^{24°}=-74°$ (c.=0.1, water). The infrared and nuclear magnetic resonance spectra were consistent with the assigned structure.

*Analysis.*—Calc'd for $C_8H_9NO_3 \cdot HBr \cdot H_2O$ (percent): C, 36.10; H, 4.55; N, 5.26. Found (percent): C, 36.20; H, 4.62; N, 5.32.

(3) A solution of 38.4 g. (0.1845 mole) of D-α-acetamido-3-aminophenylacetic acid in 600 ml. of trifluoroacetic acid prepared at 15 to 20° was cooled to 5° and 13 g. (0.1845 mole) of 98% sodium nitrite added in portions during a 10-minute period with stirring at —5°. After stirring for an additional 25 minutes 90 ml. of acetic acid was added at —5 to 0°. The mixture was heated at 45 to 50° for one and one-half hours (gas evolution), refluxed for one-half hour, cooled, and poured onto 500 g. of ice flakes. The volatile materials were removed at reduced pressure. The residue was refluxed with 400 ml. of 2 N hydrochloric acid for one hour. Concentration to a small volume gave the crystalline hydrochloride salt. The dried product (27 g.) was recrystallized from wet acetic acid (150 ml. acetic acid plus 7 ml. of water) giving 21 g. of D-α - amino - 3 - hydroxyphenylacetic acid hydrochloride monohydrate; M.P. 149–152° dec., $[\alpha]_D^{24°}=-103.0°$ (c.=0.5, water).

Example 10

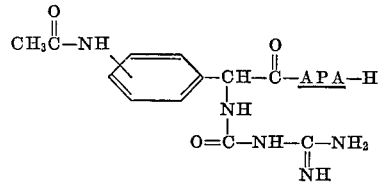

6-[D-α-(3-guanyl-1-uredio)-(3- and 4-acetamido) phenylacetamido]penicillanic acid.—These two products are prepared by substituting for the ampicillin in the procedure of Example 1 an equimolar weight of the 6-[D-α-amino-(3- and 4-acetamido)phenylacetamido]penicillanic acids which are prepared from the D-α-amino-3- and 4-acetamidophenylacetic acids as taught above and in the art.

The necessary D-α-amino-3- and 4-acetamidophenylacetic acids are each prepared by the methods known to the art and also, preferably, by the following procedures:

(A) D-α-acetamido-phenylacetic acid.—A suspension of 50 g. (0.331 mole) of D-(—)-2-phenylglycine in 700 ml. of water was cooled to 0 to 5° and 13.2 g. (0.331 mole) of sodium hydroxide was added with stirring giving a solution. Acetic anhydride (67.5 g., 0.662 mole) was added rapidly in one portion to the vigorously stirred solution which was initially cooled to 0 to 5° by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25°. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188°, $[\alpha]_D^{24°}=-217.9°$ (c.=1, 95% ethanol). This compound is reported in Beil. 14, 591.

D-α-acetamido-4-nitrophenylacetic acid.—D - α - acetamidophenylacetic acid (20 g., 0.104 mole) was slowly added to 50 ml. of concentrated sulfuric acid with cooling as needed to maintain the temperature at 20 to 25°. The mixture was stirred for about 20 minutes until most of the solid dissolved. Nitric acid (90%, d.=1.5, 9.7 ml., 0.208 mole) was added dropwise at such a rate to the stirred mixture that the salt-ice cooling bath maintained the temperature in the range 0 to —5°. The reaction mixture was stirred at —5 to —10° for an additional 30 minutes and then poured onto about 300 g. of ice flakes. The white crystalline product was collected by filtration, washed with water and recrystallized three times from 1:1 95% ethanol-water; M.P. 180–182° dec. yield 11.5 g. (46.4%). An additional recrystallization from ethyl acetate did not change the melting point; $[\alpha]_D^{24°} = -206.4°$ (c.=0.5, 95% EtOH).

*Analysis.*—Calc'd for $C_{10}H_{10}N_2O_5$ (percent): C, 50.42; H, 4.23; N, 11.76. Found (percent): C, 50.14; H, 4.07; N, 11.96.

D-α-acetamido-4-aminophenylacetic acid.—A solution of 15 g. (0.063 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° dec. The product was recrystallized four times from 1:1 95% ethanol-water; wt. 4.8 g., M.P. 207–209° dec., $[\alpha]_D^{24°} = -182.2°$ (c.=0.5, 1 N HCl).

*Analysis.*—Calc'd for $C_{10}H_{12}N_2O_3$ (percent): C, 57.71; H, 5.81; N, 13.46. Found (percent): C, 57.61, 57.64; H, 5.67; N, 13.18.

D-α-amino-4-acetamidophenylacetic acid. D-α-acetamido-4-aminophenylacetic acid (39.2 g., 0.188 mole) in 400 ml. of 2 N hydrochloric acid was refluxed for 2 hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-α-amino-4-amino-phenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml. of thioacetic acid. The mixture was stirred for 17 hours at 24° under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20% NaOH, heated to 95°, carbon treated, and the product allowed to crystallize in the cold overnight. The resulting gelatinous mass was broken up by warming. The solid was removed by filtration; wt. 0.2 g., M.P. 203–206° dec. The filtrate was diluted with an equal volume of 95% ethanol giving 1.4 g. of D-α-amino-4-acetamidophenylacetic acid; M.P. 214–215° dec., $[\alpha]_D^{24°} = -133.4°$ (c.=0.5, 1 N HCl).

*Analysis.*—Calc'd for $C_{10}H_{12}N_2O_3$ (percent): C, 57.71; H, 5.814; N, 13.46. Found (percent): C, 56.80, 56.72; H, 5.84, 5.89; N, 13.62; $H_2O$, 1.32. Found values corrected for 1.32% water: C, 57.52; H, 5.71; N, 13.80.

(B) D-α-amino-3-aminophenylacetic acid.—A solution of 9.8 g. (0.05 mole) of D-α-amino-3-nitrophenylacetic acid [P. Friis and A. Kjaer, Acta Chimica Scand. 17, 2391 (1963); British patent specification, 1,033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30°. After 1 hour an additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurrying with 95% ethanol. After drying in a vacuum oven for 3 hours at 40° and then in vacuo over phosphorus pentoxide for 64 hours there was obtained 25.7 g. of D-α-amino - 3-amino-phenylacetic acid; M.P. 188–191°, $[\alpha]_D^{24°} = -139.0$ (c.=1 in HCl).

The preparation of this compound has been described by P. Friis and A. Kjaer, Acta Chimica Scand. 17, 2391 (1963).

D-α-amino-3-acetamidophenylacetic acid.—A mixture of 5 g. (0.0301 mole) of D-α-amino-3-aminophenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate the product started to crystallize. The concentrate was diluted with 95% ethanol and, after chilling in an ice bath, the product was filtered and washed with 95% ethanol; wt. 1.8 g. The filtrate was further diluted with 95% ethanol giving an additional 2.3 g. of product. The two crops of product were combined, dissolved in a small amount of water by warming, the solution concentrated slightly and diluted with a large volume of 95% ethanol. The initial crop of solid was removed by filtration and the filtrate stored in the cold for 16 hours giving, after drying at 65° for 3 hours in vacuo over phosphorus pentoxide, 0.90 g. of product, M.P. 185–187° dec. The product was twice recrystallized from 1:1 95% ethanol-water; wt. 0.36 g., M.P. 186–187° dec., $[\alpha]_D^{24°} = -120°$ (c.=0.5, 1 N HCl).

*Analysis.*—Calc'd for $C_{10}H_{12}N_2O_3$ (percent): C, 57.7; H, 5.81; N, 13.5. Found (percent): C, 47.29; H, 6.79; H, 11.21; $H_2O$, 18.3. Found values corrected for 18.3% water: C, 57.9; H, 5.83; N, 13.7.

Example 11

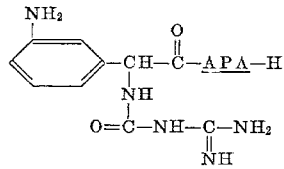

Potassium 6-[D-α-(3-guanyl-1-ureido)-3-aminophenylacetamido]penicillanate.—This product is prepared by substituting for the ampicillin in the procedure of Example 1 an equimolar weight of 6-[D-α-amino-3-aminophenylacetamido]-penicillanic acid which is prepared in turn either by the procedure of British Pat. 1,033,257 or from 2-(3-amino-phenyl)glycine by the acylation procedure of U.S. Pat. 3,140,282.

Example 12

When in the procedure of Example 1 the D-α-aminobenzyl-penicillin used therein is replaced with 5.25 mmoles of:

D-α-amino-p-sulfamylbenzylpenicillin,
D-α-amino-p-chlorobenzylpenicillin,
D-α-amino-p-methoxybenzylpenicillin,
D-α-amino-p-diethylaminobenzylpenicillin,
D-α-amino-p-trifluoromethylbenzylpenicillin,
D-α-amino-2,4-dibromobenzylpenicillin,
D-α-amino-o-nitrobenzylpenicillin,
D-α-amino-m-methylbenzylpenicillin,
D-α-amino-o-iodobenzylpenicillin,
D-α-amino-o-acetamidobenzylpenicillin,
D-α-amino-2,6-dichlorobenzylpenicillin,
D-α-amino-o-chlorobenzylpenicillin, and
D-α-amino-2-chloro-6-fluorobenzylpenicillin, respectively, the following penicillins are produced:

D-α-(3-guanyl-1-ureido)-p-sulfamylbenzylpenicillin,
D-α-(3-guanyl-1-ureido)-p-chlorobenzylpenicillin,
D-α-(3-guanyl-1-ureido)-p-methoxybenzylpenicillin,
D-α-(3-guanyl-1-ureido)-p-diethylaminobenzylpenicillin,
D-α-(3-guanyl-1-ureido)-p-trifluoromethyl-benzylpenicillin, D-α-(3-guanyl-1-ureido)-2,4-dibromobenzylpenicillin,
D-α-(3-guanyl-1-ureido)-o-nitrobenzylpenicillin,
D-α-(3-guanyl-1-ureido)-m-methylbenzylpenicillin,
D-α-(3-guanyl-1-ureido)-o-iodobenzylpenicillin,
D-α-(3-guanyl-1-ureido)-o-acetamidobenzylpenicillin,
D-α-(3-guanyl-1-ureido)-2,6-dichlorobenzylpenicillin,
D-α-(3-guanyl-1-ureido)-o-chlorobenzylpenicillin, and
D-α-(3-guanyl-1-ureido)-2-chloro-6-fluorobenzylpenicillin respectively.

Example 13

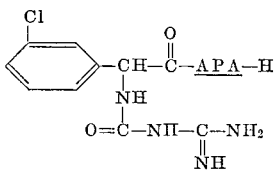

6-[D-α-(3-guanyl-1-ureido)-3-chlorophenylacetamido]-penicillanic acid.—This product is prepared by substituting for the ampicillin in the procedure of Example 1 an equimolar weight of 6-[D-α-amino-3-chlorophenylacetamido]-penicillanic acid which is itself prepared by the methods known to the art and also, preferably, by the following procedures:

DL-α-amino-3-chlorophenylacetic acid.—A solution of 250 g. of m-chlorobenzaldehyde in 1.5 l. of 95% ethanol was added in one portion to a stirred solution of 123 g. of sodium cyanide, 515 g. of ammonium carbonate and 1.5 l. of water. The mixture was stirred at 50° for 120 hours. The cooled reaction mixture was acidified to pH 2 with concentrated hydrochloric acid and stirred one hour. The hydantoin was collected by filtration, washed with cold water, and sucked dry on the filter.

A mixture of the crude hydantoin obtained from two runs and 4 l. of 10% sodium hydroxide was refluxed for 18 hours. The solution was carbon treated and neutralized to pH 7 with acetic acid. The solid was collected by filtration, washed with water, and dried on the filter. A suspension of the product in 4 l. of water was acidified to pH 2 with concentrated hydrochloric acid. After stirring for 1.5 hours the insoluble material was removed by filtration and the filtrate adjusted to pH 7 with 10% sodium hydroxide. The precipitate was collected by filtration and dried in vacuo at 75° for 18 hours giving 311 g. of DL-α-amino-3-chlorophenylacetic acid; M.P. 266–269° dec.

DL-α-formamido-3-chlorophenylacetic acid.—To 100 g. of DL-α-amino-3-chlorophenylacetic acid was added 1.33 l. of formic acid. The reaction mixture was warmed to 50° and 483 ml. of acetic anhydride was added dropwise. After storage overnight the DL-α-formamido-3-chlorophenylacetic acid was collected by filtration and washed with water; yield 97 g.

D-(−)-α-amino-3-chlorophenylacetic acid.—α-Formamido-3-chlorophenylacetic acid (721 g.) and one kg. of dehydroabietylamine were combined in 4 l. of methanol. After storing in the cold for two hours the crystalline salt was collected by filtration. The product was recrystallized from methanol-water; yield 598 g., $$[\alpha]_D^{25°} = -225°$$

(c.=0.4, methanol). The salt slurried in 2 l. of methanol and 2 liters of saturated sodium bicarbonate solution. The mixture was diluted with 2 l. of water, layered with methyl isobutyl ketone, and stirred vigorously. The aqueous phase was separated and acidified to pH 2 with conc. hydrochloric acid. The acid was collected by filtration and dried. The dried product was combined with 2 l. of 6 N hydrochloric acid and 750 ml. of methanol, the mixture heated for two hours, and filtered. The solution was adjusted to pH 5 with ammonium hydroxide. The solid was collected by filtration and washed with water and acetone giving 112 g. of D-(−)-α-amino-3-chlorophenylacetic acid; $[\alpha]_D^{23°} = -125°$ (c.=0.4, 1 N HCl).

D-(−)-α-amino-3-chlorophenylacetyl chloride hydrochloride.—To a stirred suspension of 25 g. of D-(−)-α-amino-3-chlorophenylacetic acid in 375 ml. of methylene chloride at 2° was added 36.5 g. of phosphorus pentachloride. After stirring at 0 to 2° for one and one-half hours the product D-(−)-α-amino-3-chlorophenylacetyl chloride hydrochloride was collected by filtration, washed with methylene chloride and "Skellysolve B," and dried in vacuo to constant weight; yield 17.0 g.

6-[D-α-amino-3-chlorophenylacetamido]penicillanic acid β-naphthalenesulfonate.—A suspension of 32.4 g. (0.150 mole) of 6-aminopenicillanic acid in 320 ml. of water was adjusted to pH 6.5 with 20% sodium hydroxide. The resulting clear solution was diluted with 1280 ml. of tetrahydrofuran and then adjusted to pH 3.5 with 6 N hydrochloric acid. The rapidly stirred mixture was cooled to −40° and 17.0 g. (0.0708 mole) of D-(−)-α-amino-3-chlorophenylacetyl chloride hydrochloride was added in one portion. The cooling bath was removed and the temperature of the reaction mixture brought to 0° during 40 minutes. The mixture was adjusted to pH 4.5 and the solid removed by filtration, the filter cake being washed with 300 ml. of water. The filtrate was adjusted to pH 7.0 with 20% sodium hydroxide and the tetrahydrofuran removed at reduced pressure on a rotary flash evaporator. The aqueous concentrate was filtered. The filtrate was adjusted to pH 2 with 6 N hydrochloric acid and extracted twice with methyl isobutyl ketone. The aqueous phase was adjusted to pH 4.5 with triethylamine, layered with 150 ml. of methyl isobutyl ketone and treated with 37.2 ml. of a 43% aqueous solution of β-naphthalenesulfonic acid. After stirring at 0 to 2° for two hours the crystalline product, 6-[D-α-amino-3-chlorophenylacetamido]penicillanic acid β-Naphthalenesulfonate, was collected by filtration, washed with water, and air dried; yield 11.2 g., M.P. 190–200° dec. with prior softening and darkening above about 175°. The infrared spectrum was consistent with 6-[D-α-amino-3-chlorophenylacetamido]penicillanic acid β-naphthalenesulfonate.

6-[D-α-amino-3-chlorophenylacetamido]penicillanic acid.—A suspension of 27.3 g. of 6-[D-α-amino-3-chlorophenylacetamido]penicillanic acid β-naphthalenesulfonate in 500 ml. of water was adjusted to pH 7.5 with triethylamine and stirred for one hour. The mixture was then slowly adjusted to pH 4.5 with 6 N hydrochloric acid and stirred for two hours at 0°. The crystalline product was collected by filtration, washed with water, air dried, and then dried in vacuo over phosphorus pentoxide; yield 12.3 g. A suspension of the product (12 g.) in one l. of water was adjusted to pH 1.5–1.6 with 6 N hydrochloric acid. The mixture was filtered twice through diatomaceous earth ("Super Cel") to remove insoluble material. The clear filtrate was adjusted to pH 4.3 with 20% sodium hydroxide and stirred at 2° for two hours. The crystalline 6-[D-α-amino-3-chlorophenylacetamido]penicillanic acid was collected by filtration, washed with a small amount of water, and dried in vacuo over phosphorus pentoxide; yield 7.0 g., M.P. 203–204° dec., with prior darkening, $[\alpha]_D^{23°} = +261.9°$ (c.=0.5, 0.1 N HCl).

Analysis.—Calc'd for $C_{16}H_{18}ClN_3O_4S$ (percent): C, 50.06; H, 4.73; N, 10.92. Found (percent): C, 50.00; H, 4.76; N, 10.5.

This compound is also named 6-[R-α-amino-3-chlorophenylacetamido]penicillanic acid in the nomenclature of Cahn, Ingold and Prelog, Experientia, XII(3), 81–94 (Mar. 15, 1956); all of the "D" penicillins in this specification are "R" penicillins in the system of Cahn et al.

Example 14

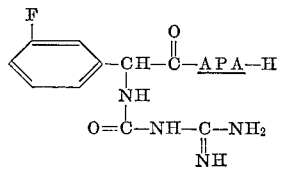

6-[D-α-(3-guanyl - 1 - ureido) - 3 - fluorophenylacetamido]penicillanic acid.—This product is prepared by substituting for the ampicillin in the procedure of Example 1 an equimolar weight of 6-[D-α-amino-3-fluorophenylacetamido]penicillanic acid which is itself prepared by the methods known to the art and also, preferably, by the following procedures:

DL-α-amino-3-fluorophenylacetic acid.—To a stirred solution of 24.5 g. of sodium cyanide, 29.5 g. of ammonium chloride, 25 ml. of ammonium hydroxide and 100 ml. of water at room temperature was added a solution of 62.0 g. of m-fluorobenzaldehyde in 200 ml. of methanol. The mixture was stirred at 38° for two hours. The methanol was stripped off at reduced pressure. The residue was extracted with two by 200-ml. portions of ethyl acetate. The combined extracts were washed with water. To the ethyl acetate phase was added dropwise with vigorous stirring 50 ml. of 6 N hydrochloric acid at room temperature. The solution was put under vacuum (water aspirator) and 250 ml. of 6 N hydrochloric acid added dropwise. The mixture was refluxed for 2.5 hours, stirred for 13 hours, and adjusted to pH 4.8 with concentrated ammonium hydroxide while cooling in an ice bath. The aqueous phase was decanted and the gummy precipitate triturated with water and ethyl acetate. The product DL-α-amino-3-fluorophenylacetic acid was collected by filtration and dried in vacuo over phosphorus pentoxide; yield 8.6 g., M.P. 200–203° (sublimation). A second crop of product separated from the filtrates; yield 2.0 g., M.P. 245–250° (sublimation).

DL-α-formamido-3-fluorophenylacetic acid.—A partial solution of 35 g. of DL-α-amino-3-fluorophenylacetic acid in 356 ml. of 88% formic acid was heated to 50° and 119 ml. of acetic anhydride added dropwise. The mixture was stirred for 17 hours at 50–60° and cooled. The product, DL-α-formamido-3-fluorophenylacetic acid, was collected by filtration and dried in vacuo; yield 38.5 g., M.P. 207–209° dec.

D-α-formamido-3-fluorophenylacetic acid.—To a solution of 20 g. of DL-α-formamido-3-fluorophenylacetic acid in 4 l. of pH 7 phosphate buffer was added 3.0 g. of hog kidney D-amino acid oxidase (Nutritional Biochemicals Corp.). The mixture was stored at 37° for 19.5 hours, adjusted to pH 5.0 with acetic acid, 5 g. of carbon added, heated to 60° for one-half hour, and filtered. The filtrate was adjusted to pH 2 with 40% phosphoric acid and extracted with ethyl acetate. The ethyl acetate extract was washed with water and stripped to dryness giving 10.0 g. of product; M.P. 190–192°, $[\alpha]_D^{24°} = -161.0°$ (c.=1.06, methanol). The product was again treated with hog kidney D-amino acid oxidase (1 g.) in 500 ml. of pH 7 phosphate buffer and the product worked up as above. There was obtained after recrystallization of the product from methanol 5.7 g. of D-α-formamido-3-fluorophenylacetic acid; $[\alpha]_D^{24°} = -178.0°$ (c.=1.0, methanol).

D-α-amino-3-fluorophenylacetic acid.—A suspension of D-α-formamido-3-fluorophenylacetic acid (9.48 g.) in 100 ml. of 6 N hydrochloric acid was refluxed for one-half hour. The reaction mixture was cooled in an ice bath, filtered, and adjusted to pH 3.8 with concentrated ammonium hydroxide. After stirring for 10 minutes the product, D-α-amino-3-fluorophenylacetic acid, was collected by filtration and dried in vacuo over phosphorus pentoxide; yield 6.63 g., $[\alpha]_D^{24°} = -110°$ (c.=1.0, 1 N hydrochloric acid), M.P. 249–250°.

D-α-(carbobenzoxyamino)-3-fluorophenylacetic acid.—To D-α-amino-3-fluorophenylacetic acid (4.9 g.) partially dissolved in 300 ml. of water at pH 10 (10% sodium hydroxide used) at 0° was added 11.2 g. of carbobenzoxy chloride. The vigorously stirred mixture was maintained at pH 10 by the addition of 10% sodium hydroxide. A white gum formed. After one hour the reaction mixture was extracted once with ether. The aqueous phase was layered with ethyl acetate and acidified to pH 3 with 6 N hydrochloric acid. Three additional extractions with ethyl acetate were made. The combined ethyl acetate extracts were washed with water, dried with magnesium sulfate, the solvent stripped off at reduced pressure, the resulting residual oil solidified with "Skellysolve B," collected by filtration, and dried in vacuo over phosphorus pentoxide; yield 4.3 g. of D-α-(carbobenzoxyamino)-3-fluorophenylacetic acid, M.P. 117–119°, $[\alpha]_D^{24°} = -80°$ (c.=1.0, methanol).

6-(D-α-amino - 3 - fluorophenylacetamido)penicillanic acid.—Ethyl chloroformate (1.53 g.) was added to a solution of 4.2 g. of D-α-(carbobenzoxyamino)-3-fluorophenylacetic acid and 1.94 ml. of triethylamine in 70 ml. of tetrahydrofuran at −5°. After stirring for 10 minutes a solution of 3.03 g. of 6-amino-penicillanic acid and 1.94 ml. of triethylamine in 70 ml. of 50% aqueous tetrahydrofuran was added all at once. The mixture was stirred for one-half hour at 0° and then the ice bath was removed for one hour. The reaction mixture was diluted with 250 ml. of water and the tetrahydrofuran distilled off at reduced pressure. To the residue was added 350 ml. of ethyl acetate and 7 ml. of 42% phosphoric acid. Two additional extractions with 250-ml. portions of ethyl acetate were made. The combined ethyl acetate extracts were washed with water, dried with magnesium sulfate, and the solvent distilled off at reduced pressure. The residue was solidified with "Skellysolve B," collected by filtration, and dried in vacuo over phosphorus pentoxide giving 4.8 g. of 6-[D-α-(carbobenzoxyamino)-3-fluorophenylacetamido]-penicillanic acid.

The carbobenzoxy penicillin was dissolved in 50 ml. of 3% sodium bicarbonate plus 50 ml. of dioxane and hydrogenated in the presence of 4.8 g. of 30% palladium on diatomaceous earth for 25 minutes on a low pressure Paar hydrogenation apparatus. Phosphoric acid (42%) was added to the hydrogenation mixture to coagulate the catalyst. The mixture was filtered, methyl isobutyl ketone was added to the filtrate, and the mixture again filtered, removing all catalyst. The aqueous phase was separated, adjusted to pH 4.5 with 10% sodium hydroxide, and the dioxane distilled off at reduced pressure. The concentrate was readjusted to pH 4.5, 2-propanol added, and concentrated giving a gelatinous precipitate which was collected by filtration and washed with ether.

The crude product was stirred with 5 ml. of water for 30 minutes, collected by filtration, and dried in vacuo over phosphorus pentoxide; yield 700 mg. The infrared and nuclear magnetic resonance spectra were consistent with 6-(D-α-amino-3-fluorophenylacetamido)penicillanic acid.

Example 15

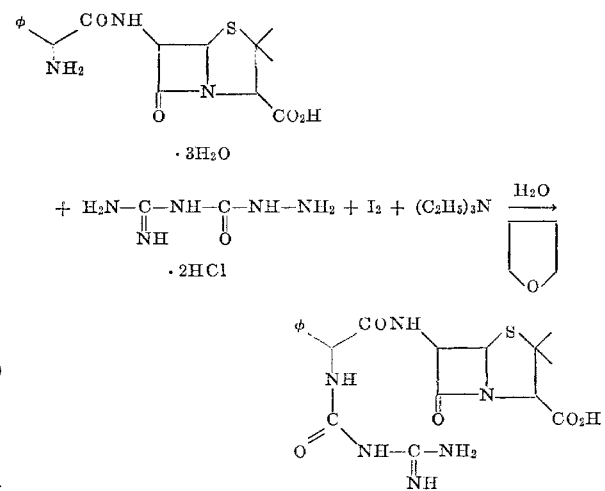

6 - [D - α - (3-guanyl-1-ureido)-phenylacetamido]-penicillanic acid.—To a stirred, ice-cooled solution of 0.403 g. (1 mmole) of ampicillin trihydrate and 0.190 g. (1 mmole) of 4-guanyl-semicarbazide dihydrochloride in 3.5 ml. of $H_2O$ and 2.5 ml. of tetrahydrofuran was added 0.98 ml. (7 mmoles) of triethylamine. A solution of 0.51 g. (2 mmoles) of iodine in 2.0 ml. of tetrahydrofuran was then added dropwise over about 30 seconds until the reaction mixture acquired a permanent iodine color (1.5 ml. was required). Stirring with ice cooling was continued for 5 minutes, then 10% aqueous sodium thiosulfate was added dropwise to take up the excess iodine. The reaction mixture was concentrated under reduced pressure to remove most of the tetrahydrofuran, then, with ice cooling, the pH was lowered to 6.4 with 1 N HCl. After storage in ice for 45 min., the precipitate was collected by centrifugation, washed with water and dried to give 0.105 g. of 6-[D-α-(3-guanyl-1-ureido)-phenylacetamido]-penicillanic acid.

Example 16

6-[D-α-(3-guanyl-1-ureido)-2 - thienylacetamido]-penicillanic acid and 6-[D-α-(3-guanyl-1-ureido)-3-thienyl-acetamido]-penicillanic acid, respectively, are prepared by substituting an equimolar weight of 6-(D-α-amino-2-thienylacetamido)penicillanic acid and 6-(D-α-amino-3-thienylacetamido)penicillanic acid, respectively, for the ampicillin in the procedure of Example 15.

Example 17

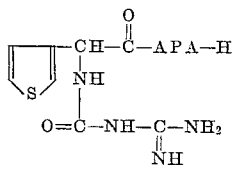

6-[D-α-(3-guanyl - 1 - ureido) - 3 - thienylacetamido]-penicillanic acid.—A solution was prepared by combining an ice-cooled solution of 1.2 g. (6.28 mmoles) of 4-guanyl-semicarbazide dihydrochloride in 7.2 ml. of $H_2O$ with a solution of 0.42 g. (6.28 mmoles) of $NaNO_2$ in 1.6 ml. of $H_2O$ and allowing the mixture to stir at 0° for 10 min. This solution was added to a stirred, ice-cooled solution prepared by suspending 1.92 g. (4.72 mmoles) of 6-(D-α-amino-3-thienylacetamido)penicillanic acid in 6 ml. of $H_2O$ and adding sufficient triethylamine to bring the pH to 9.0. The pH of the resulting mixture was adjusted to 6 with triethylamine. After 10 min., the precipitate which had separated was removed by filtration and dried under reduced pressure to give 0.625 g. of product. An additional 0.13 g. of product was obtained by lowering the pH of the filtrate to 5.0 with 42% $H_3PO_4$, and stirring for 30 min. at 0°, then removing the precipitate by filtration and drying under reduced pressure. The first crop, which contained traces of the starting penicillin, was purified by dissolving in 5 ml. of $H_2O$ at pH 9.0 with triethylamine with ice cooling and then acidifying to pH 5.5 with 42% $H_3PO_4$ and collecting and drying the crystals, giving 0.3 g. Total yield of purified product 6-[D-α-(3-guanyl-1-ureido) - 3 - thienylacetamido] - penicillanic acid was 0.43 g., M.P. 192°.

The infrared spectrum of the product has strong bands at 3380 (broad), 1170, 1725, 1690, 1625, and 1530 cm.[1] and differs especially from the spectrum of the starting penicillin in the region 1650–1730 cm.[-1].

A determination was made of the Minimum Inhibitory Concentrations (M.I.C.) in mcg./ml. of this product ("CMPD") and ampicillin ("AMP") versus various organisms in nutrient broth. The results were as follows:

| Organism | M.I.C. in mcg./ml. | |
|---|---|---|
| | CMPD | AMP |
| D. pneumoniae plus 5% serum | ≤.02 | .004 |
| Str. pyogenes | ≤.02 | .008 |
| S. aureus Smith | .3 | .06 |
| S. aureus Smith plus 50% serum | .6 | .06 |
| S. aureus Smith plus H. ceph-ase | | |
| S. aureus 1633-2 | 2 | 2 |
| Pr. morganii | 250 | 63 |
| E. coli A9675 | 250 | 125 |
| E. coli Juhl A15119 | 2 | 4 |
| Sal. enteritidis | ≤1 | .13 |
| K. pneumoniae A9977 | ≤1 | .5 |
| K. pneumoniae A15130 | 250 | 125 |
| Ps. aeruginosa | ≤1 | 63 |
| Pr. mirabilis A9900 | ≤1 | .3 |

Example 18

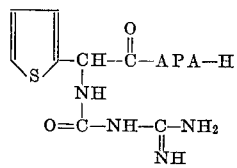

6-[D-α-(3-guanyl - 1 - ureido) - 2 - thienylacetamido]-penicillanic acid.—An ice-salt cooled solution of 1.2 g. of 4-guanylsemicarbazide dihydrochloride in 7.2 ml. of $H_2O$ was combined with a solution of 0.420 g. of $NaNO_2$ in 1.6 ml. of $H_2O$ and stirred for 10 min. at 0°. This solution was then added ot an ice-cooled solution of 1.92 g. (4.72 mmoles) of 6-(D-α-amino-2-thienylacetamido)-penicillanic acid in 6 ml. of $H_2O$ containing sufficient triethylamine to bring the pH to 10.0. After stirring 20 min. at 0°, the precipitate was collected and dried. The filtrate was acidified to pH 5 and stirred with ice cooling for 15 min. The precipitate was collected and dried. The combined precipitate weighed 0.52 g. This was precipitated twice by dissolving in cold water with the minimum amount of base and then acidifying to pH 6, yielding 0.15 g. of purified 6-[D-α-(3-guanyl-1-ureido)-2-thienylacetamido]-penicillanic acid, M.P. 198°.

The infrared spectrum of this product has strong bands at 3350, 1770, 1720, 1690, 1610, and 1520 cm.[-1], and differs considerably from the spectrum of the starting penicillin, particularly in the 1650–1730 cm.[-1] region.

A determination was made of the Minimum Inhibitory Concentrations (M.I.C.) in mcg./ml. of this product ("CMPD") and ampicillin ("AMP") versus various organisms in nutrient broth. The results were as follows:

| Organism | M.I.C. in mcg./ml. | |
|---|---|---|
| | CMPD | AMP |
| D. pneumoniae plus 5% serum | .004 | .004 |
| Str. pyogenes | .004 | .008 |
| S. aureus Smith | .3 | .06 |
| A. aureus Smith plus 50% serum | .3 | .06 |
| S. aureus Smith plus H. ceph-ase | | |
| S. aureus 1633-2 | 1.3 | 1 |
| Pr. morganii | 8 | 63 |
| E. coli A9675 | 16 | 32 |
| E. coli Juhl | 1.3 | 2 |
| Sal. enteritidis | .04 | .13 |
| K. pneumoniae A9977 | .3 | .5 |
| K. pneumoniae A15130 | 63 | 125 |
| Ps. aeurginosa | 1.3 | 250 |
| Pr. mirabilis A9900 | .16 | .6 |

Example 19

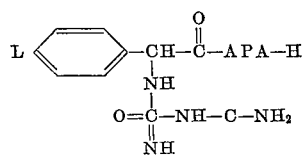

6 - [L-α-(3 - guanyl-1-ureido)-phenylacetamido]-penicillanic acid.—To a stirred, ice-cooled solution of 1.92 g. (4.7 mmoles) of 6-(L-α-aminophenylacetamido)-penicillanic acid in 6 ml. of H₂O adjusted to pH 9.5 with triethylamine was added a solution which had been previously prepared by combining cold solutions of 1.2 g. (6.3 mmoles) of 4-guanylsemicarbazide dihydrochloride in 7.2 ml. of H₂O and 0.42 g. (6.3 mmoles) of NaNO₂ in 1.6 ml. of H₂O and stirring for 10 min. The pH of the resulting mixture was adjusted to 6.5 with triethylamine. After stirring at 0° for 20 min., the precipitate was collected and dried, yielding 0.378 g. The filtrate was acidified to pH 5.5 with 42% H₃PO₄, then stirred at 0° for 20 min. The precipitate was collected and dried, giving an additional 0.115 g. for a total yield of 0.493 g of 6-[L-α-(3-guanyl-1-ureido)-phenylacetamido]-penicillanic acid

Example 20

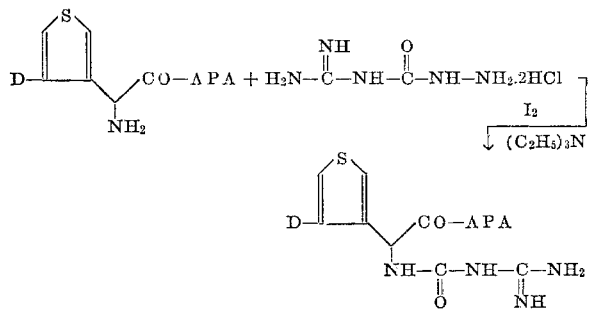

6 - [D-α-(3-guanyl-1-ureido)-3-thienylacetamido]-penicillanic acid.—To a stirred, ice-cooled mixture of 0.5 g. of 4-guanylsemicarbazide dihydrochloride and 1.05 g. of 6 - (D-α-amino-3-thienylacetamido)-penicillanic acid in 9.2 ml. of water and 6.6 ml. of tetrahydrofuran was added 2.46 ml. of triethylamine, then a solution of 1.34 g. of iodine in 5.3 ml. of tetrahydrofuran was added dropwise until the solution acquired a permanent iodine color (3.7 ml. was required). The reaction mixture was then stirred for about 3 minutes, then 10% aqueous sodium thiosulfate was added dropwise to take up the excess iodine. Most of the tetrahydrofuran was removed from the reaction mixture by concentration under reduced pressure, then, with ice cooling, the pH was adjusted to 6.4 with 1 N hydrochloric acid. Cooling was continued for 30 minutes, then the precipitate was collected by filtration, washed with water, and dried to give 0.55 g. of 6-[D-α-(3-guanyl-1-ureido)-3-thienylacetamido]-pencillanic acid.

Example 21

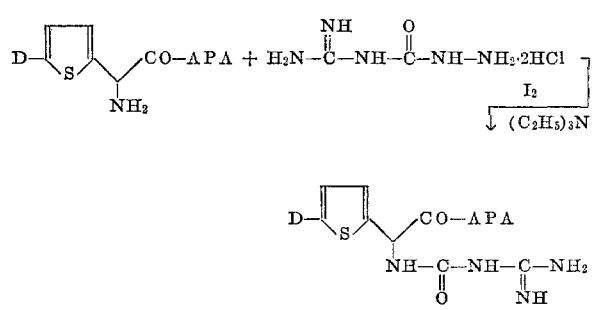

6 - [D-α-(3-guanyl-1-ureido)-2-thienylacetamido]-penicillanic acid.—To a stirred, ice-cooled mixture of 2.0 g. of 4-guanyl-semicarbazide dihydrochloride and 4.2 g. of 6 - (D-α-amino - 2-thienylacetamide)-pencillanic acid in 36.8 ml. of water and 26.2 ml. of tetrahydrofuran was added 9.84 ml. of triethylamine, then a solution of 5.36 g. of iodine in 21 ml. of tetrahydrofuran was added dropwise until the solution acquired a permanent iodine color. The reaction mixture was then stirred for about 3 minutes, then 10% aqueous sodium thiosulfate was added dropwise to take up the excess iodine. Most of the tetrahydrofuran was removed from the reaction mixture by concentration under reduced pressure, then, with ice cooling, the pH was adjusted to 6.4 with 1 N hydrochloric acid. Cooling was continued for about 30 minutes, then the precipitate was collected by filtration, washed with water, and dried to give 3.5 g. of product. This was purified by slurrying in 5 ml. of ice-cooled water, carefully adding 1 N sodium hydroxide until solution is attained, then acidifying to pH 6.0 with 1 N hydrochloric acid. The precipitate was collected by filtration, washed with water, and dried to give 1.7 g. of 6-[D-α-(3-guanyl-1-ureido)-2-thienylacetamido]-penicillanic acid. The infrared and n.m.r. spectra were consistent with the assigned structure.

Example 22

6 - [D-α-(3 - guanyl-1-ureido)phenylacetamido]-pencillanic acid hydrochloride.—6 - [D-α-(3-guanyl-1-ureido) phenylacetamido]-pencillanic acid (2.2 g., 0.005 mole) was stirred vigorously in 300 ml. deionized water in an icebath to form a suspension of pH 5.1. There was then added 5.5 ml. of 1 N HCl (0.0055 mole) and after stirring 30 minutes a substantial amount of the penicillin had gone into solution and the pH had dropped to 2.4. The mixture was filtered, removing 0.4 g. unreacted starting material. The filtrate was lyophilized to give solid 6-[D-α - (3 - guanyl - 1 - ureido)-phenylacetamido]-penicillanic acid hydrochloride, 1.5 g., which bio-assayed 740 mcg./mgm. aaginst starting material as the standard.

Example 23

6 - [D-α-(3-guanyl-1-ureido)phenylacetamido]-penicillanic acid lactate.—6 - [D-α-(3-guanyl-1-ureido)phenylacetamido]-pencillanic acid (2.2 g., 0.005 mole) was stirred vigorously in 300 ml. deionized water in an ice bath to form a suspension of about pH 5.1. There was then added 0.9 ml. lactic acid (50% Food Grade Monsanto T4162; 0.006 mole) and after stirring 30 minutes a substantial amount of the penicillin had gone into solution and the pH had dropped to 3.1. The mixture was filtered, removing 0.9 g. unreacted starting material. The filtrate was lyophilized to give solid 6-[D-α-(3-guanyl-1-ureido)phenylacetamido]-penicillanic acid lactate, 1.0 g., which bio-assayed 665 mcg./mgm. against starting material as the standard.

I claim:
1. A member selected from the group consisting of the compounds having the formula

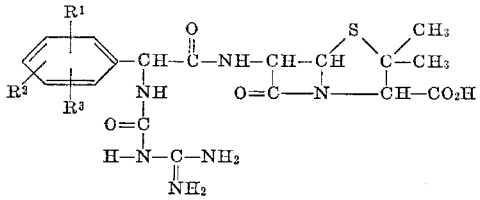

or

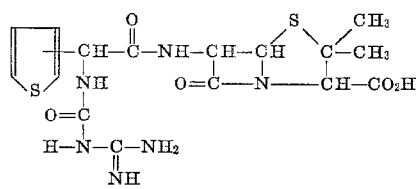

wherein $R^1$, $R^2$ and $R^3$ each is hydrogen, nitro, (lower) alkylamino, di(lower)alkylamino, (lower)alkanoylamino, di(lower)alkylamino, (lower) alkanoylamino, amino, hydroxy, (lower) alkanoyloxy, (lower)alkyl having from 1 to 6 carbon atoms inclusive, (lower)alkoxy, sulfamyl, chloro, iodo, bromo, fluoro or trifluoromethyl; and their nontoxic, pharmaceutically acceptable salts.

2. A member selected from the group consisting of the compounds of claim 1 wherein $R^1$, $R^2$, and $R^3$ are each hydrogen, hydroxy or amino.

3. A member selected from the group consisting of the compounds of claim 1 wherein $R^1$ is hydrogen, hydroxy or amino and $R^2$ and $R^3$ are hydrogen.

4. A member selected from the group consisting of the compounds of claim 1 wherein $R^1$, $R^2$ and $R^3$ are each hydrogen.

5. 6-[D-α-(3-guanyl-1-ureido)phenylacetamido] - penicillanic acid.

6. 6 - [D - α-(3-guanyl-1-ureido)-2-thienylacetamido]-penicillanic acid.

7. 6 - [D - α-(3-guanyl-1-ureido)-3-thienylacetamido]-penicillanic acid.

8. The hydrochloride of the compound of claim 5.

9. The hydrochloride of the compound of claim 6.

10. The hydrochloride of the compound of claim 7.

11. A member selected from the group consisting of the compound of claim 1 known as 6-[D-α-(3-guanyl-1-ureido)-3-thienylacetamido]penicillanic acid and its non-toxic, pharmaceutically acceptable salts.

12. A member selected from the group consisting of the compound of claim 1 known as 6-[α-(3-guanyl-1-ureido)-2-thienylacetamido]penicillanic acid and its non-toxic, pharmaceutically acceptable salts.

13. A member selected from the group consisting of the compound of claim 1 known as 6-[D-α-(3-guanyl-1-ureido)-3-thienylacetamido]penicillanic acid and its non-toxic, pharmaceutically acceptable salts.

14. A member selected from the group consisting of the compound of claim 1 known as 6-[O-α-(3-guanyl-1-ureido)-phenylacetamido]penicillanic acid and its non-toxic, pharmaceutically acceptable salts.

15. A member selected from the group consisting of the compound of claim 1 known as 6-[D-α-(3-guanyl-1-ureido)-2-thienylacetamido]penicillanic acid and its non-toxic, pharmaceutically acceptable salts.

16. A member selected from the group consisting of the compound of claim 1 known as 6-[D-α-(3-guanyl-1-ureido)-3-thienylacetamido]pencillanic acid and its non-toxic, pharmaceutically acceptable salts.

References Cited

UNITED STATES PATENTS

| | | | |
|---|---|---|---|
| 3,481,922 | 12/1969 | Holdrege | 260—239.1 |
| 3,483,188 | 12/1969 | McGregor | 260—239.1 |

NICHOLAS S. RIZZO, Primary Examiner

U.S. Cl. X.R.

424—271